(12) United States Patent
Spinney et al.

(10) Patent No.: US 6,426,943 B1
(45) Date of Patent: Jul. 30, 2002

(54) APPLICATION-LEVEL DATA COMMUNICATION SWITCHING SYSTEM AND PROCESS FOR AUTOMATIC DETECTION OF AND QUALITY OF SERVICE ADJUSTMENT FOR BULK DATA TRANSFERS

(75) Inventors: Barry A. Spinney, Wayland; Krishna Narayanaswamy, Acton, both of MA (US)

(73) Assignee: Top Layer Networks, Inc., Westboro, MA (US)

(*) Notice: Subject to any disclaimer, the term of this patent is extended or adjusted under 35 U.S.C. 154(b) by 0 days.

(21) Appl. No.: 09/285,618

(22) Filed: Apr. 3, 1999

Related U.S. Application Data

(63) Continuation-in-part of application No. 09/058,448, filed on Apr. 10, 1998, now Pat. No. 6,226,267, which is a continuation-in-part of application No. 09/060,575, filed on Apr. 15, 1998, now abandoned.

(51) Int. Cl.[7] .......................... G01R 31/08; G06F 11/00
(52) U.S. Cl. ..................... 370/235; 370/412; 370/428; 709/238
(58) Field of Search .................................. 370/230, 231, 370/235, 389, 412, 413, 415, 417, 419, 428, 429, 474, 476; 709/238, 242

(56) References Cited

U.S. PATENT DOCUMENTS

| | | | | |
|---|---|---|---|---|
| 5,418,781 A | * | 5/1995 | Kaufman et al. | 370/413 |
| 5,519,701 A | * | 5/1996 | Comant et al. | 370/412 |
| 5,604,742 A | * | 2/1997 | Colmant et al. | 370/396 |
| 5,633,865 A | * | 5/1997 | Short | 370/412 |
| 5,781,549 A | * | 7/1998 | Dai | 370/398 |
| 5,859,849 A | * | 1/1999 | Parks | 370/395 |

* cited by examiner

Primary Examiner—David R. Vincent
Assistant Examiner—Bob A. Phunkulh
(74) Attorney, Agent, or Firm—Perkins, Smith & Cohen, LLP; Stephen Y. Chow; Jerry Cohen

(57) ABSTRACT

In a data communication switch, process and apparatus for tracking the number of data bytes associated with data flow that is part of a session and automatically lowering the priority given to the transmission of the remainder of a flow once a certain threshold has been reached that indicates that the flow is part of a bulk e-mail or other bulk file transfer.

29 Claims, 35 Drawing Sheets

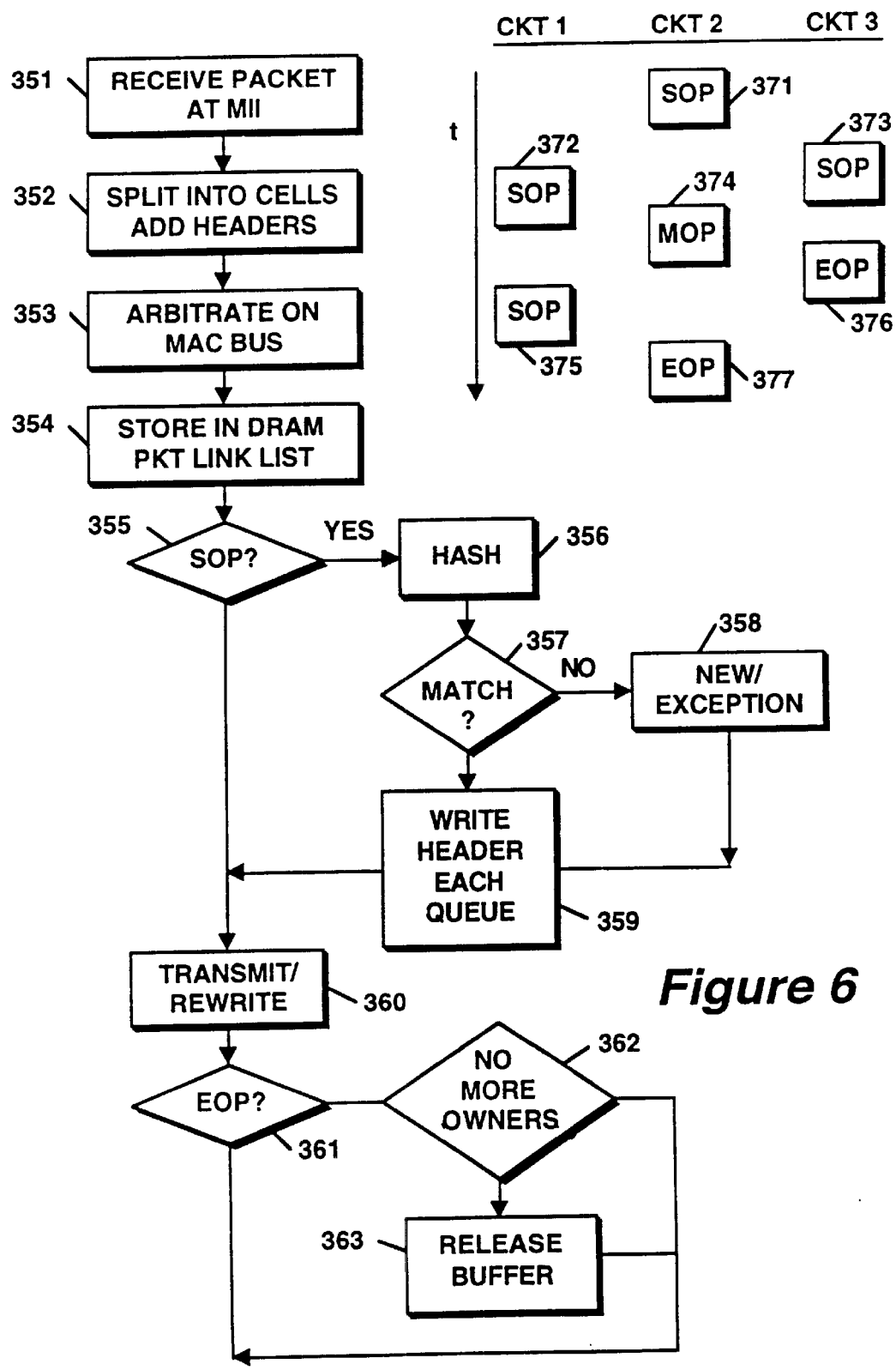

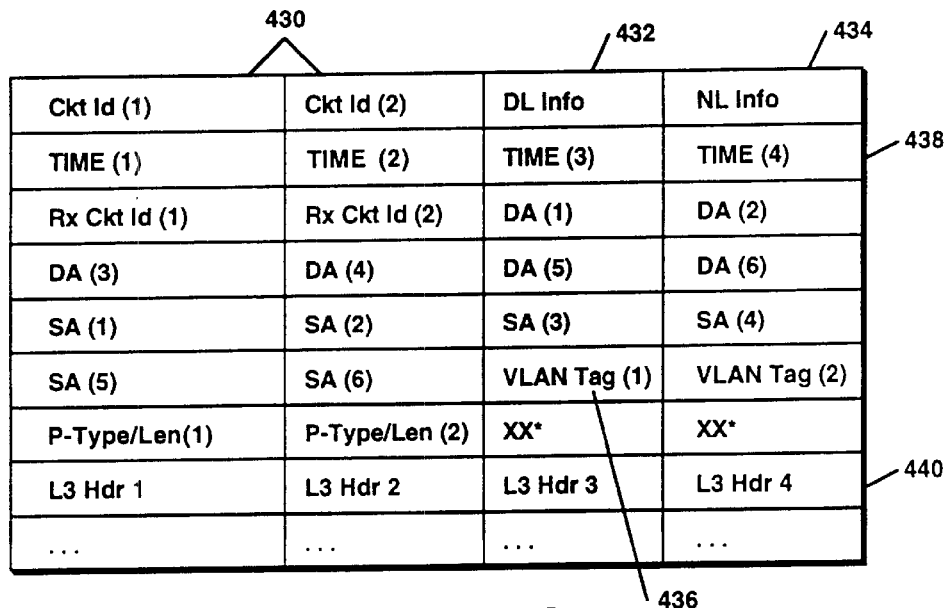

| Ckt Id (1) | Ckt Id (2) | DL Info | NL Info |
|---|---|---|---|
| TIME (1) | TIME (2) | TIME (3) | TIME (4) |
| Rx Ckt Id (1) | Rx Ckt Id (2) | DA (1) | DA (2) |
| DA (3) | DA (4) | DA (5) | DA (6) |
| SA (1) | SA (2) | SA (3) | SA (4) |
| SA (5) | SA (6) | VLAN Tag (1) | VLAN Tag (2) |
| P-Type/Len(1) | P-Type/Len (2) | XX* | XX* |
| L3 Hdr 1 | L3 Hdr 2 | L3 Hdr 3 | L3 Hdr 4 |
| ... | ... | ... | ... |

Figure 7A

| Bit 7 | Bit 6 | Bit 5 | Bit 4 | Bit 3 | Bit 2 | Bit 1 | Bit 0 |
|---|---|---|---|---|---|---|---|
| Vlan Tagged | CRC (1) | CRC (2) | XX | XX | PKT Format (1) | PKT Format (2) | PKT Format (3) |

Figure 7B

| Bit 6 | Bit 5 | DESCRIPTION |
|---|---|---|
| 0 | X | CRC Not Present - on Rcvd Pkts |
| 1 | X | CRC is Present - on Rcvd Pkts |
| 0 | 0 | Add CRC - on Xmit Pkts |
| 0 | 1 | Delete CRC - on Xmit Pkt |
| 1 | 0 | Modify CRC - on Xmit Pkts |
| 1 | 1 | Don't Change CRC - on Xmit Pkts |

Figure 7C

| Bit 2 | Bit 2 | Bit 2 | DL HEADER FORMAT |
|---|---|---|---|
| 0 | 0 | 0 | Reserved |
| 0 | 0 | 1 | DIX Format |
| 0 | 1 | 0 | SAP Format |
| 0 | 1 | 1 | Novell Raw Format |
| 1 | 0 | 0 | SNAP Format |
| 1 | 0 | 1 | SNAP 1042 Format |
| 1 | 1 | 0 | Reserved |
| 1 | 1 | 1 | Reserved |

*Figure 7D*

| Bit 7 | Bit 6 | Bit 5 | Bit 4 | Bit 3 | Bit 2 | Bit 1 | Bit 0 |
|---|---|---|---|---|---|---|---|
| OurMac(BridgeGroup) | OurMac(Port) | WellKnown DA | Protocol Kind (1) | Protocol Kind (2) | Protocol Kind (3) | Protocol Kind (4) | Protocol Kind (5) |

*Figure 8A*

| VALUE | PROTOCOL | DIX | RAW | SAP | SNAP 1042 |
|---|---|---|---|---|---|
| 0 | Unknown | | | | |
| 1 | IPv4 | 08-00 | | | 08-00 |
| 2 | ARP | 08-06 | | | 08-06 |
| 3 | IPX | 81-37 | YES | E0 | 81-37 |
| 4 | IPv6 | 86-DD | | | 86-DD |
| 5 | AppleTalk | 80-9B | | | |
| 6 | NetBeui | 80-D5 | | F0 | |
| 7 | DECnetIV | 60-03 | | | 60-03 |
| 8 | DECnet V | | | FE | |
| 31 | BLAZENET IPC | | | | |

*Figure 8B*

| Byte 0 | Byte 1 | DL Header Format |
|---|---|---|
| XX | XX | DIX Format |
| SSAP | Ctl | SAP Format - Configured SAP |
| XX | XX | SAP Format - Unknown SAP |
| XX | XX | Novell Raw Format |
| SSAP | Ctl | SNAP Format |
| P-Type(1) | P-Type(2) | SNAP 1042 Format |

*Figure 8C*

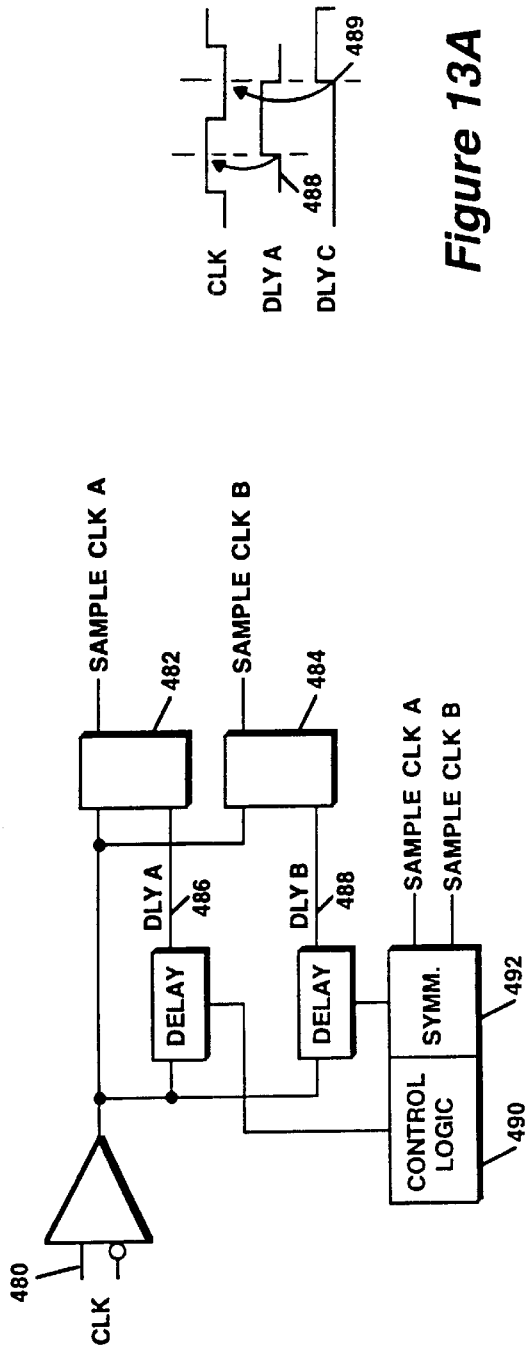
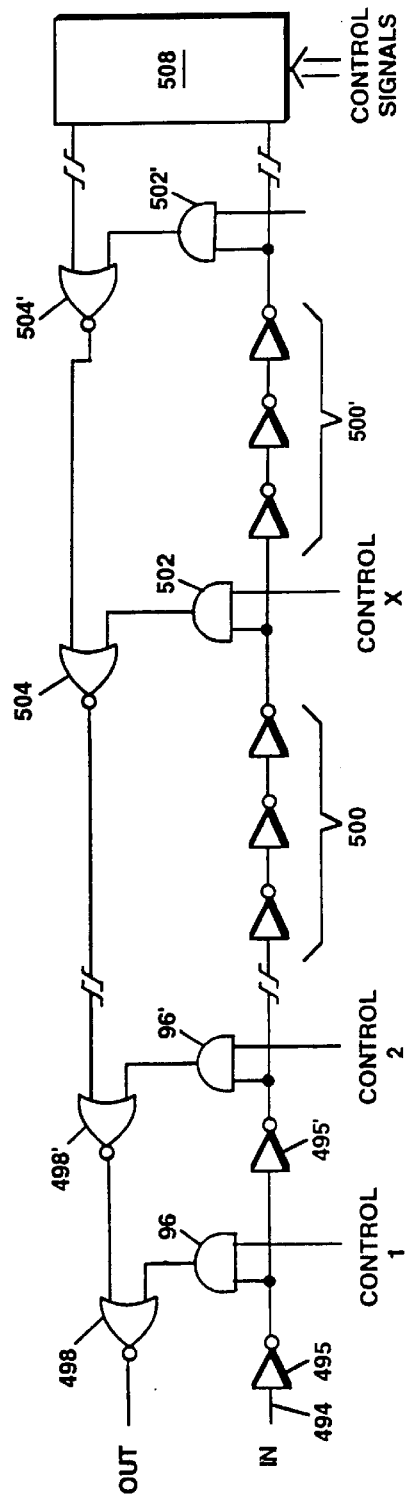
Figure 13A
Figure 13
Figure 14

| TABLE 1 | | e0 | e2 | e4 | e6 | FUNCTION |
|---|---|---|---|---|---|---|
| | | 0 | 0 | 0 | 0 | IDLE |
| CONTROL BIT VALUE | 610 { | 1 | 0 | 0 | 0 | FRAME 1 |
| | | 1 | 1 | 0 | 0 | FRAME 2 |
| | | 1 | 1 | 1 | 0 | FRAME 3 |
*Figure 15*
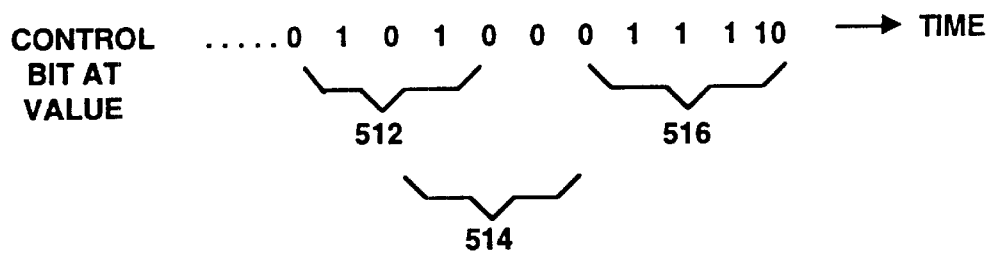
*Figure 16*
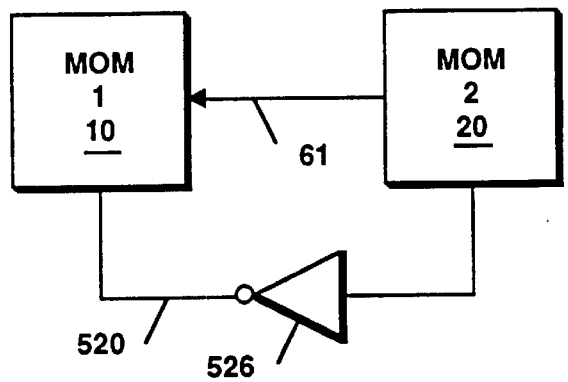
*Figure 17*

| EVEN CTRL | MEANING | ODD CTRL | |
|---|---|---|---|
| $e_0$ | = 1 ALWAYS | $e_1$ | = 1 $T_X$ CREDIT |
| $e_2$ | = 1 START OF CELL | $e_3$ | END CODE 0 |
| $e_4$ | = 1 START PKT | $e_5$ | END CODE 1 |
| $e_6$ | = 0 ALWAYS | $e_7$ | = 1 SHORT WORD |

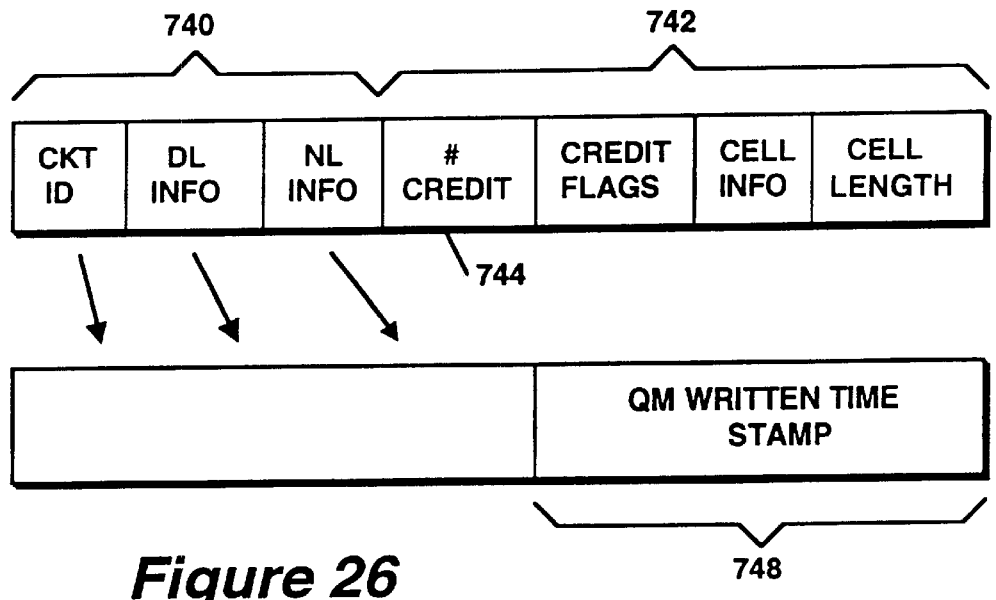
Figure 26
CELL INFO
  7 - CELL ERROR
  6 - PKT TIMEOUT
  5 - FROM BAD PKG
  4 - FROM MONITOR Q
  3 - END CELL
  2 - START CELL
  1 - DATA CELL
  0 - CREDIT CELL
Figure 27
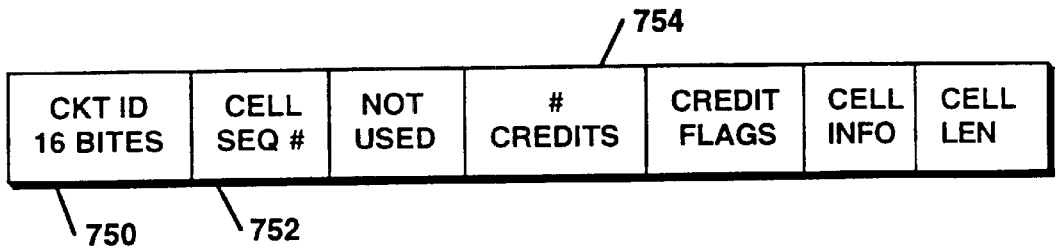
Figure 28

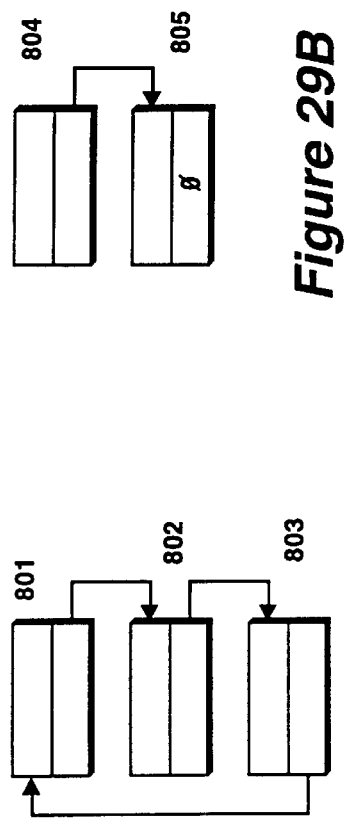
*Figure 29B*
*Figure 29*
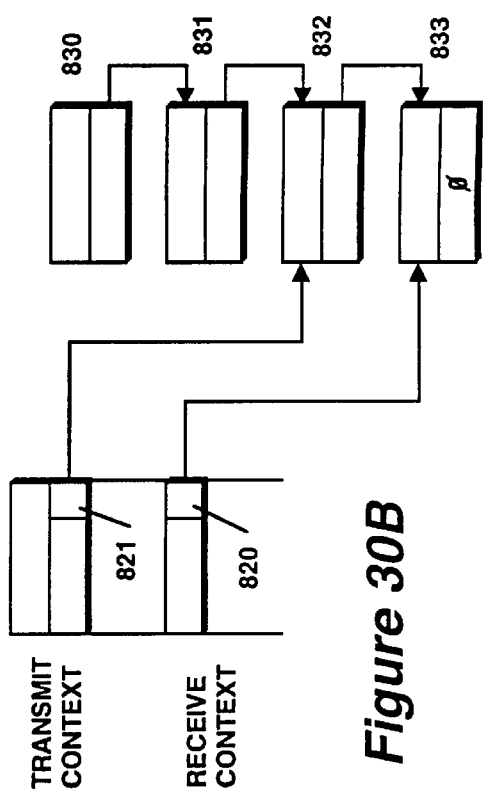
*Figure 30B*

1 QUEUE
2 STATIC Q's
3 WEIGHTED RRQ's (RR)
4 STATIC Q's
4 WEIGHTED RRQ's
2 STATIC/2RRQ's
8 STATIC
8 RR
4 STATIC/4RR
16 STATIC
16 RR
8 STATIC8/RR

APPLICATION-LEVEL DATA COMMUNICATION SWITCHING SYSTEM AND PROCESS FOR AUTOMATIC DETECTION OF AND QUALITY OF SERVICE ADJUSTMENT FOR BULK DATA TRANSFERS

CROSS-REFERENCE TO RELATED APPLICATIONS

This application is a continuation-in-part of U.S. patent application Ser. No. 09/058,448 entitled, "System and Process for Application-Level Flow Connection of Data Processing Networks" filed Apr. 10, 1998, now U.S. Pat. No. 6,226,267, and of U.S. patent application Ser. No. 09/060,575 entitled "System and Process for Flexible Queuing of Data Packets in Network Switching" filed Apr. 15, 1998, assigned to a common entity which has been renamed, now abandoned, and from which this application claims priority.

This application is being filed with application for U. S. patent for "Application-level Data Communication Switching System and Process for Automatic Detection of and Quality of Service Adjustment for Multimedia Streaming Applications" by Barry Spinney, and Krishna Narayanaswamy, filed on the same date and assigned to a common entity.

This application is also related to U.S. patent application Ser. No. 09/058,629 entitled, "High-Speed Data Bus for Network Switching" and filed Apr. 10, 1998, and U.S. patent application Ser. No. 09/058,597 entitled, "System and Process for High-Speed Pattern Matching for Application-Level Switching of Data Packets" and filed Apr. 10, 1998.

FIELD OF THE INVENTION

This invention relates generally to computer networks and more particularly to handling bulk data transfers and network switches and nodes.

BACKGROUND OF THE INVENTION

A problem with existing data communications switches is the overloading of a switch or node with bulk or large transfers of data such as in bulk e-mail or other bulk file transfers. This congestion of a switch may disrupt more time-sensitive traffic such as video or audio streaming, which is becoming more important with the advance of Internet telephony, video conferencing and video on demand.

In the field of connecting networks, a variety of different network protocols are used to communicate between different data processing systems on particular networks making communication between such networks difficult. Most network protocols require considerable configuration of parameters when adding computer systems or nodes, typically accomplished by manual input of device addresses by network professionals who nonetheless make mistakes. This problem may be exacerbated when connecting across network boundaries Current connection of networks, including the mechanisms used to connect the so-called Internet, is accomplished using devices known as "bridges" and "routers." Roughly speaking, bridges connect different networks at the "data link" layer or Layer 2 of the OSI Network model, see Schwartz, Mischa, *Telecommunication Networks* at 75–99 (Addison-Wesley 1987), and routers connect different networks at the "network" layer or Layer 3 of the OSI model, wherein a packet of data is preceded by headers corresponding to layers of communication, with the first in time header corresponding to the lowest Layer 1, the physical link, and proceeding up to Layer 7, the application layer (other models have fewer layers and the "application layer" may refer and here refers to functions at Layers 5–7 of the OSI model). When packets of information are received at a bridge, the bridge processor forwards the packet on a data link according to the information in the data link header (following the physical link header). When packets of information are received at a router, the packet is routed according to the information in the network header. These headers, however, do not contain information about the quality of service required by the application to which the data packet pertains; thus, each packet is forwarded according to the data link or network protocol which may or may not include a priority flag, typically for network management operations.

The types of applications requiring data transmission on current networks call for a wide range of service. Thus, in communications with a file server, requests uploaded from a client for downloading of data require relatively little bandwidth, while downloading of massive amounts of data requires great bandwidth to be accomplished in a reasonable time. Streaming of audio-visual ("multimedia") information requires guaranteed bandwidth at regular intervals to avoid perceivable interruptions or "jitter". E-mail, file server requests, HTTP, word processing each have their own application protocols with associated header information that can be associated with their communication needs, including bandwidth.

Network switching schemes that consider information above the network layer, so-called "Layer 4 switches," are just coming on the market and appear typically to involve software implementations that are slow and only consider a portion of the Layer 4 or transport layer header (the "TCP" part of TCP/IP or transport control protocol/internetwork protocol).

It remains desirable to have a way of scheduling bulk transfers of data efficiently and effectively while maintaining the flow of time-sensitive data transfers through a network switch.

It is an object of the present invention to provide a method and apparatus to schedule bulk transfers of data through a network switch without disrupting other data flow through the switch.

It is another object of the present invention to provide a method and apparatus to prevent data overload of a network switch by a bulk transfer of data.

SUMMARY OF THE INVENTION

The problems of handling bulk data transfers in communications networks are solved by the present invention of an application-level data communication switching system and process for automatic detection of and quality of service adjustment for bulk data transfers.

In the present invention, a data communication switch and process is provided for tracking the number of data bytes processed by the switch that is associated with a data flow that is part of a session by comparing information derived from the contents of a session-level header in data packets. Upon reaching a certain threshold that indicates that the flow is part of a bulk e-mail or other bulk file transfer, the switch automatically lowers the priority given to the transmission of the remainder of the flow.

The present invention together with the above and other advantages may best be understood from the following detailed description of the embodiments of the invention illustrated in the drawings, wherein:

BRIEF DESCRIPTION OF THE DRAWINGS

FIG. 6 is a general flow diagram of the processes used in the preferred embodiment of the invention;

FIG. 7A shows the data structure of a canonical header used in the preferred embodiment of the invention;

FIG. 7B shows the data structure of a portion of the canonical header used in the preferred embodiment of the invention;

FIG. 7C shows the data structure and possible entries of another portion of the canonical header used in the preferred embodiment of the invention;

FIG. 7D shows the data structure and possible entries of another portion of the canonical header used in the preferred embodiment of the invention;

FIG. 8A shows the data structure of another portion of the canonical header used in the preferred embodiment of the invention;

FIG. 8B shows the data structure and possible entries of another portion of the canonical header used in the preferred embodiment of the invention;

FIG. 8C shows the data structure and possible entries of another portion of the canonical header used in the preferred embodiment of the invention;

FIG. 13 is a schematic of a clock delay circuit used in transmission on the bus shown in FIG. 9;

FIG. 13A is a timing diagram of signals on the circuit shown in FIG. 13;

FIG. 14 is a detail of the circuit shown in FIG. 13;

FIG. 15 (Table 1) shows the possible values and meanings of a control bit used in the bus shown in FIG. 9;

FIG. 16 shows a sequence of control bits shown in FIG. 15;

FIG. 17 is a block diagram showing the token ring arbitration used between the interface chips shown in FIG. 1;

FIG. 26 shows the data structure of a field of the canonical header used in the preferred embodiment at different times;

FIG. 27 shows details of the data structure of one of the subfields shown in FIG. 26;

FIG. 28 shows the data structure of a temporary "burst" header used in the preferred embodiment of the invention;

FIG. 29 shows a set of linked descriptors mapped to a data packet used in the preferred embodiment;

FIG. 29B shows a set of linked descriptors used in the preferred embodiment to describe an incomplete packet;

FIG. 30B shows the linking to buffer descriptors of receive and transmit context tables used in the preferred embodiment to track data cells forming a packet;

DETAILED DESCRIPTION OF PREFERRED EMBODIMENTS

The specification will be organized as follows:
1. BlazePath™/BlazeFire™ Architecture/Chip Set
2. Header "Canonicalization" and Packet "Cellularization"
3. BlazeWire™ High-Speed MAC Bus
4. Data Flow In
5. Queue Pointer Management and Operation
6. Relay Engine Operations/Flow Matching (FastPath™)
7. Transmission Scheduling
8. Download to Interfaces/Transmission Credit Loops
9. Ultra-High Speed RAMBUS® Operation
10. Background Engine/Initialization/Monitoring
11. Scheduling for Bulk Transfer 1. BlazePath™/BlazeFire™ Architecture/Chip Set The architecture of the invention, called the BlazePath™ architecture, comprises application layer flow switching or connection performed by virtually allocating (by pointers to high speed data buffers) incoming data packets to one or more of a large number of virtual queues according to decisions made on the basis of information in the application header of the packets characterizing their membership in a particular flow. To enhance the throughput or bandwidth of the system, a preferred embodiment, the AppSwitch™ application flow switch, makes decisions according to the initial packet(s) of the flow and matches a hashed version of the header information to identify subsequent packets of the flow. By "canonicalizing" the header information of the incoming flow and splitting lengthy frames into smaller internal cells (but keeping them logically connected), the system is "cell or frame" independent.

Figure 1:
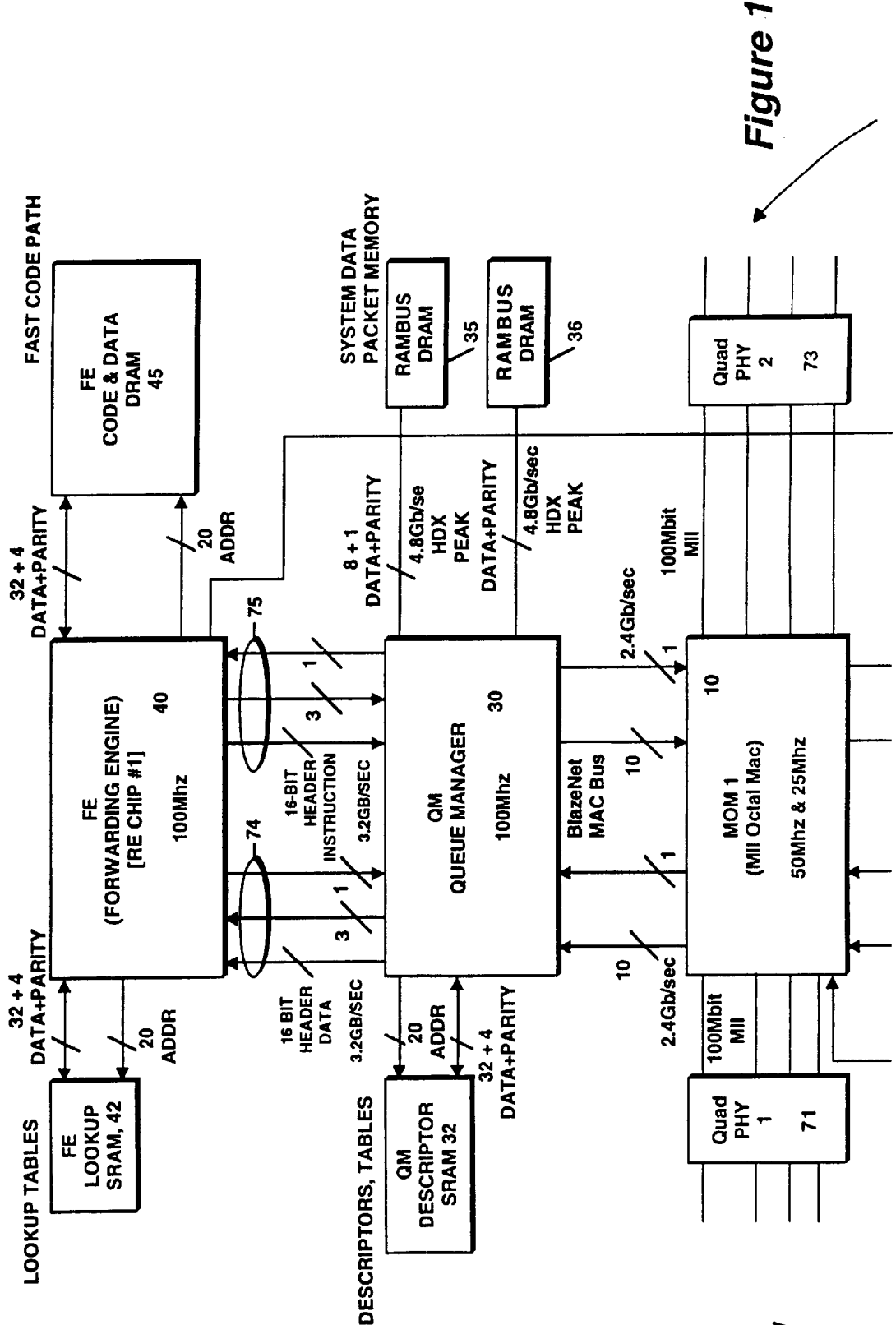
FIG. 1 is a block diagram of a preferred embodiment of the invention.
Figure 1A:
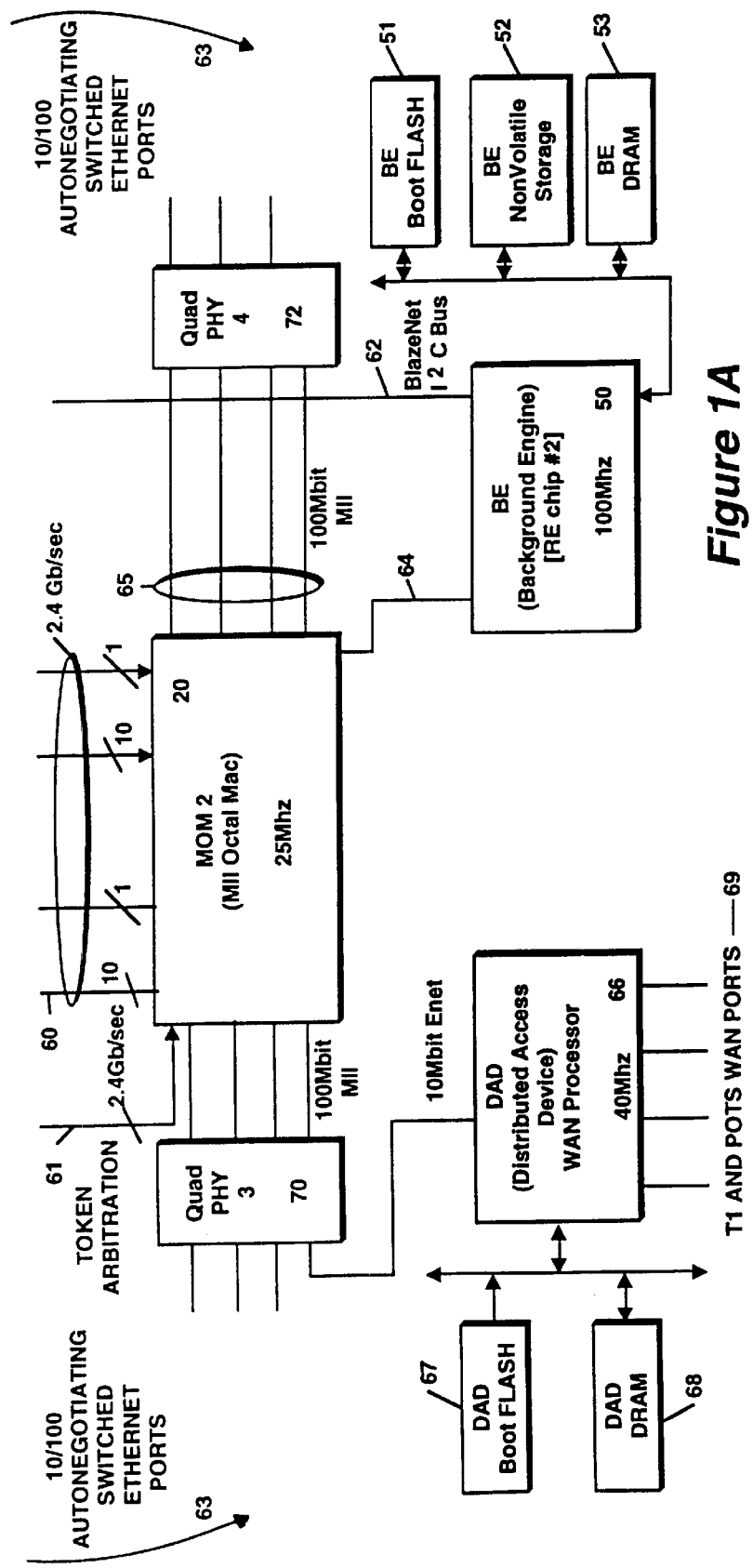

Referring to FIG. 1, in a preferred embodiment, the architecture is implemented in the BlazeFire™ chipset connected by the BlazeWire™ MAC Bus 60. The architecture is centered around a 287 k-gate Queue Manager ("QM") ASIC 30 operating at 100 MHz which implements the queue-pointer scheme allowing 16,000,000 queues for pointers (24-bit definition) to locations in a high-speed data buffer 35 and 36 connected to the QM 30 in which incoming packets are temporarily stored. The queues are loaded based on decisions made by the 410 k-gate Relay Engine ("RE") or Forwarding Engine ("FE") ASIC 40 operating at 100 MHz which includes an Argonaut RISC (ARC) central processing unit 387 and a FIFO 394 for packet headers to be examined. The input to and output from the system is performed using 359 k-gate 60 MHz MOM (MII [Media-Independent Interface] Octal MAC) ASICs 10 and 20 daisy-chained on the BlazeWire™ MAC Bus 60; the MOM chips 10 and 20 may each serve two Quad physical link chips (71 and 72, and 70 and 73, respectively) for local area Ethernets 63 or an interface for a wide area network such as the Distributed Access Device (DAD) WAN Processor 66 servicing T1 and POTS ("Plain Old Telephone Service") WAN lines 69 or for a Background Engine ("BE") 50.

Figure 2:
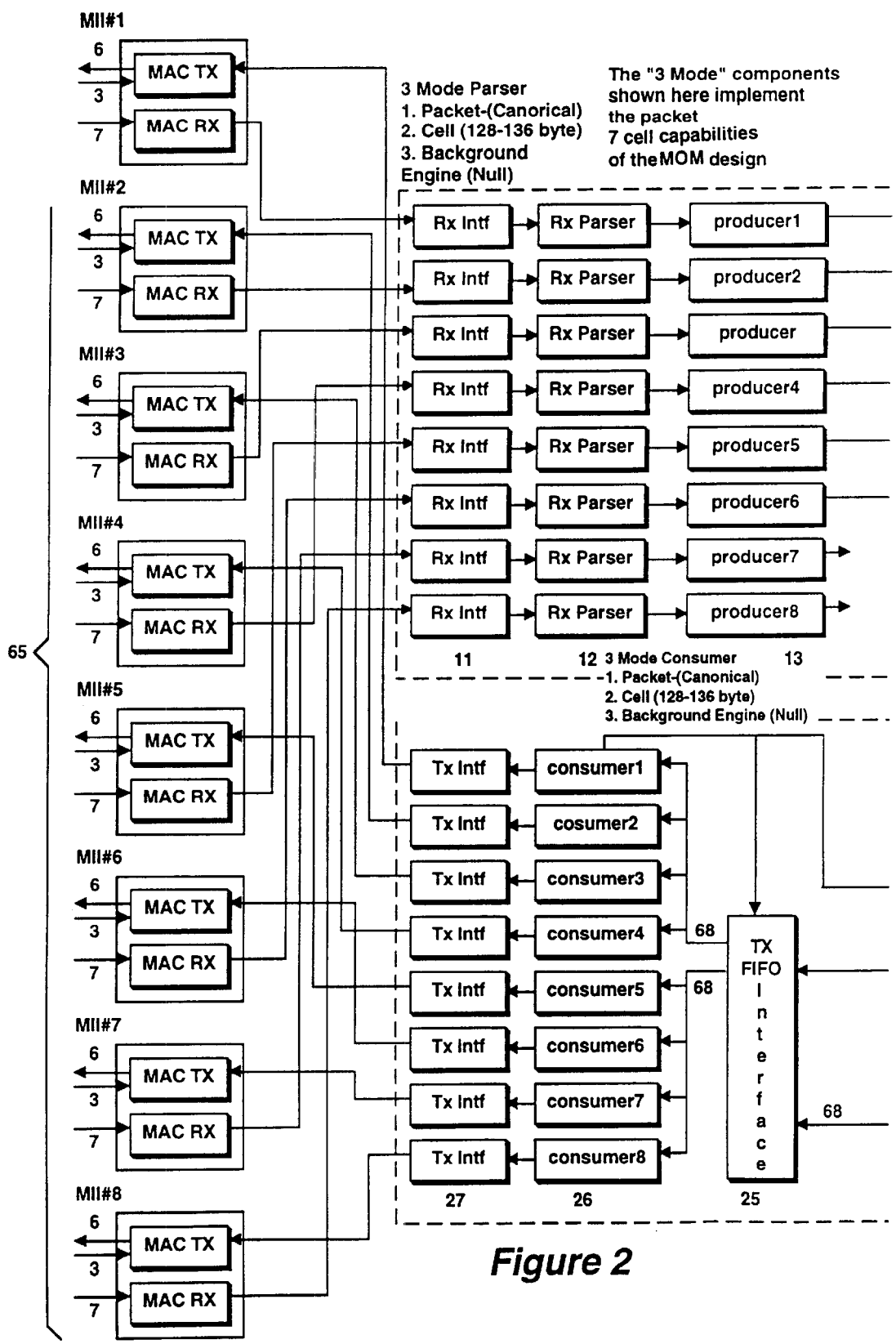
FIG. 2 is a block diagram of the media interface ASIC (MOM) of the preferred embodiment of the invention.
Figure 2A:
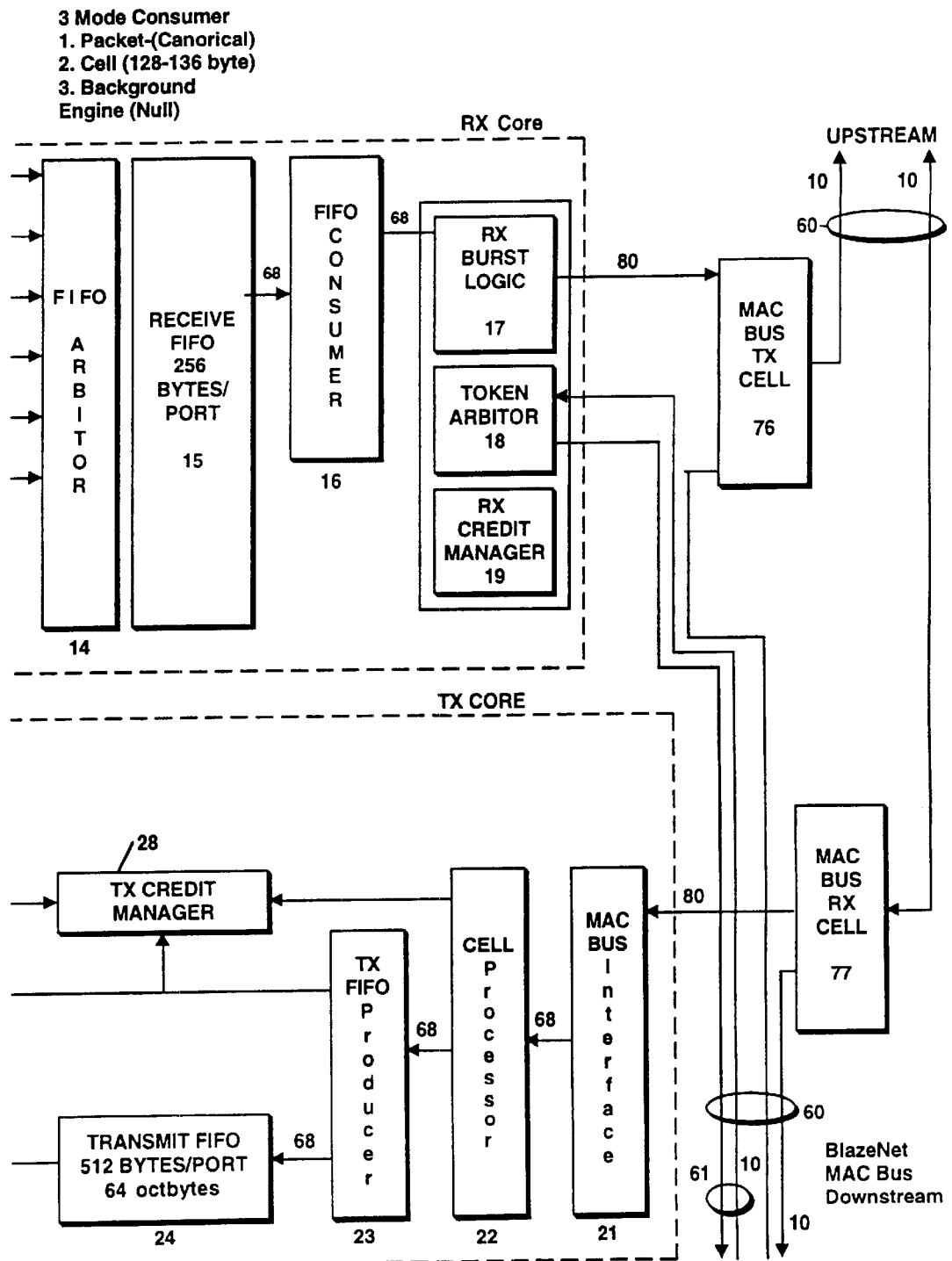

FIG. 2 is a block diagram of the MOM chip, for example MOM chip 10, used in the preferred embodiment of the invention. Generally, the diagram shows MII interfaces 65 providing eight duplexed Ethernet ports. The receive interfaces 11 and parsers 12 receive the data packets, rewrite the frame headers as the canonical headers described in Section 2 below, and divide the resulting packets into 128-byte cells, which are placed in FIFO 15 by producers 13 and the FIFO arbiter 14, in round robin arbitration among the eight ports. Data cells not bearing a canonical header (packet cells following the first cell of the packet) have a burst header added by burst logic 17 for internal tagging of the data. RX Credit Manager 19 adds transmission credits (discussed in Section 8 below) to the headers as appropriate to inform QM 30 that the transmit FIFO 24 can accept more data to be transmitted. A token arbiter 18 determines when the data is to be sent to the MAC Bus TX cell 76 to be transmitted on the MAC bus 60 to QM 30.

Still referring to FIG. 2, data cells incoming on MAC Bus 60 are directed to the transmit consumers 26 and according to the circuit identifiers in their canonical/burst headers. The data packet headers are reconstructed and transmitted by the transmit consumers 26 and interfaces 27, and TX Credit Manager 28 is updated with credit information to be returned to the QM 30.

Figure 3:
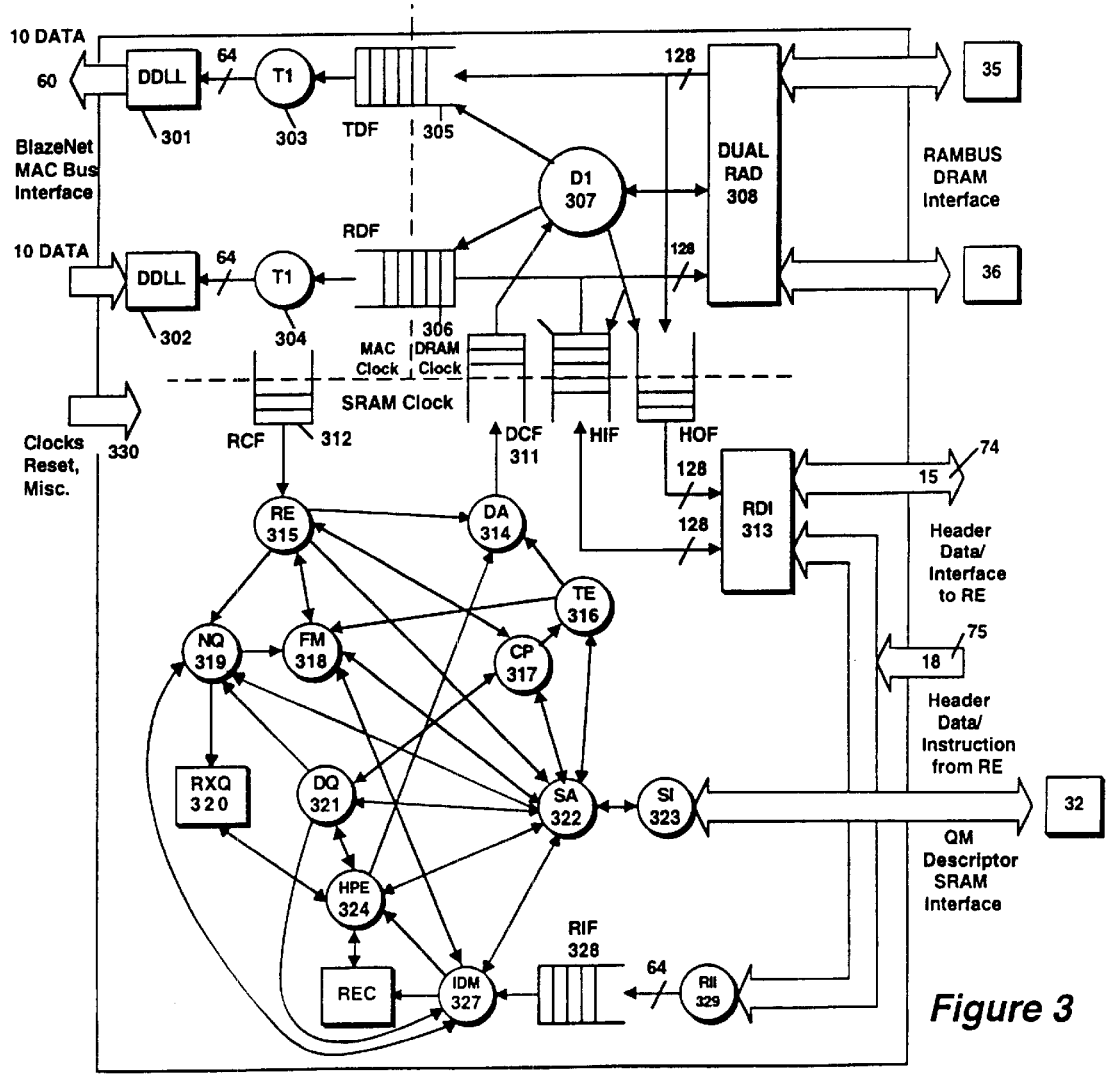
FIG. 3 is a block diagram of the queue manager ASIC (QM) of the preferred embodiment of the invention.

FIG. 3 is a block diagram of the QM 30 used in the preferred embodiment of the invention. Essentially, QM 30 is a collection of gates and state machines designed to rapidly execute the placing of data cells on appropriate queues (implemented virtually by linked lists of pointers to data buffers) and to apply queue policies as directed by the RE 40. The QM 30 is divided into three clock regimes. The interface with the MAC bus 60 through Digital Delay Locked Loop 302 and Receive Interface 304, supplying Receive Data FIFO 306 and Receive Command FIFO 312, and through Digital Delay Locked Loop 301 and Transmit Interface 303 draining Transmit Data FIFO 305, is on the MAC bus clock. Data cells received are channeled directly through Dual RAMBUS® Access Cell 308 into the DRAMs 35 and 36 as discussed below. The DRAM Interface 307, operating on the DRAM clock, coordinates the operation of MAC bus FIFOs 305 and 306 as well as Header Out FIFO 309 (containing canonical header cells to be sent to the RE 40 [not shown] on Header Data Interface 74), Header In FIFO 310 (containing canonical headers rewritten at the Relay engine Data Interface 313 with appropriate routing information) and DRAM Command FIFO 311. The latter contains the decisions of the RE as implemented by the QM logic shown in the network of functions under the SRAM clock domain. Receive Engine 315, Transmit Engine 316 and Header Prefetch Engine 324 direct the function of DRAM Arbiter 314 to provide instructions to the DRAM Interface 307 to move data in and out of DRAMs 35 and 36. Receive Engine 315 and Transmit Engine 316 also coordinate with Free Buffer Manager 318 to allocate buffers in DRAMs 35 and 36 to incoming data. EnQueue Manager 319 and DeQueue Manager 312 coordinate with Header Prefetch Engine and the Receive Queue State (head and tail of receive queue pointers, discussed in Section 5 below) 320, to determine, among other things, when cells containing canonical header data should be sent to the RE 40 for pattern-matching and the corresponding packets taken off the receive queue. The Header Prefetch engine 324 coordinates with the Relay Engine Context 326 and the Instruction Dispatch Manager 327, which receives instructions from RE 40 via interface 75, Relay Engine Instruction Interface 329 and the Relay Engine Instruction FIFO 328. Circuit Poller 317 polls the Transmit Engine 316 circuit by circuit to transmit cells and coordinates with the SRAM Arbiter 322, which through the SRAM Interface 323, accesses linked lists of buffer pointers ("descriptors") in SRAM 32 to track component cells of the packets as they are received and transmitted on one or more queues. These operations, where appropriate field mappings are hard-wired, provide for a great deal of flexibility in scheduling and routing executed at very high speed.

Figure 4:
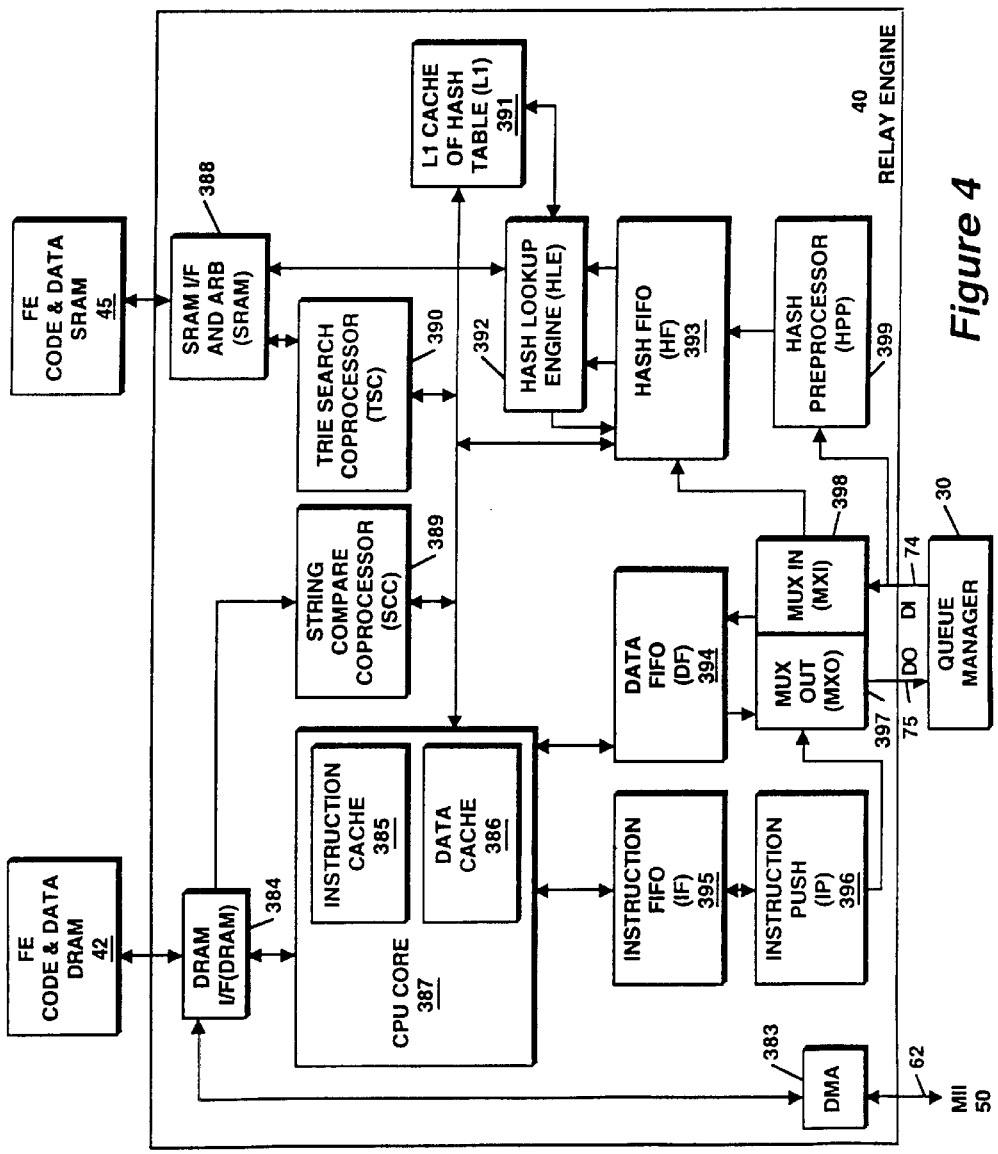
FIG. 4 is a block diagram of the relay (forwarding) engine ASIC (RE) of the preferred embodiment of the invention.

FIG. 4 is a block diagram of RE 40. A primary function of the RE 40 is to examine canonicalized packet headers received at interface 74 from the QM 30 and to determine rapidly whether the packet belongs to a known flow and to provide instructions accordingly on interface 75 for appropriate scheduling (quality of service) A CPU Core 387 (implemented with the ARC processor) contains an instruction cache 386 and a data cache 385 and communicates with the Code and Data DRAM 42 through the DRAM Interface 384 (which also accepts instructions from the BE 50 over a low speed bus 62 and the DMA 383 at initialization). String Compare Coprocessor 389 is used to aid the pattern recognition used to match a packet and flow. Generally, a canonicalized packet header entering the RE 40 is pre-processed by the Hash Preprocessor 399 in parallel with being MUXed into Data FIFO 394 by MUXIn 394. The results of the parallel hashing are placed in Hash FIFO 393 and compared by the Hash Lookup Engine 392 with contents of the on-board L1 Cache of the Hash Table (of known hashes of header information associated with particular flow characteristics) 391. If no match is found in the L1 Cache 391, the Hash Lookup Engine 392 will look to the entire Hash Table stored in Lookup SRAM 45, accessed through SRAM Interface and Arbitrator 388. Trie Search Coprocessor 390 is used to find the proper flow parameters in situations (discussed below) where the fast pattern matching is not appropriate or fails. With the flow parameters determined, an appropriate instruction is issued by CPU 387 into the Instruction FIFO 395 and processed by Instruction Push 396 multiplexed with any data from Data FIFO 394 by MUXOut 397 across interface 75 into the QM 30.

Figure 5:
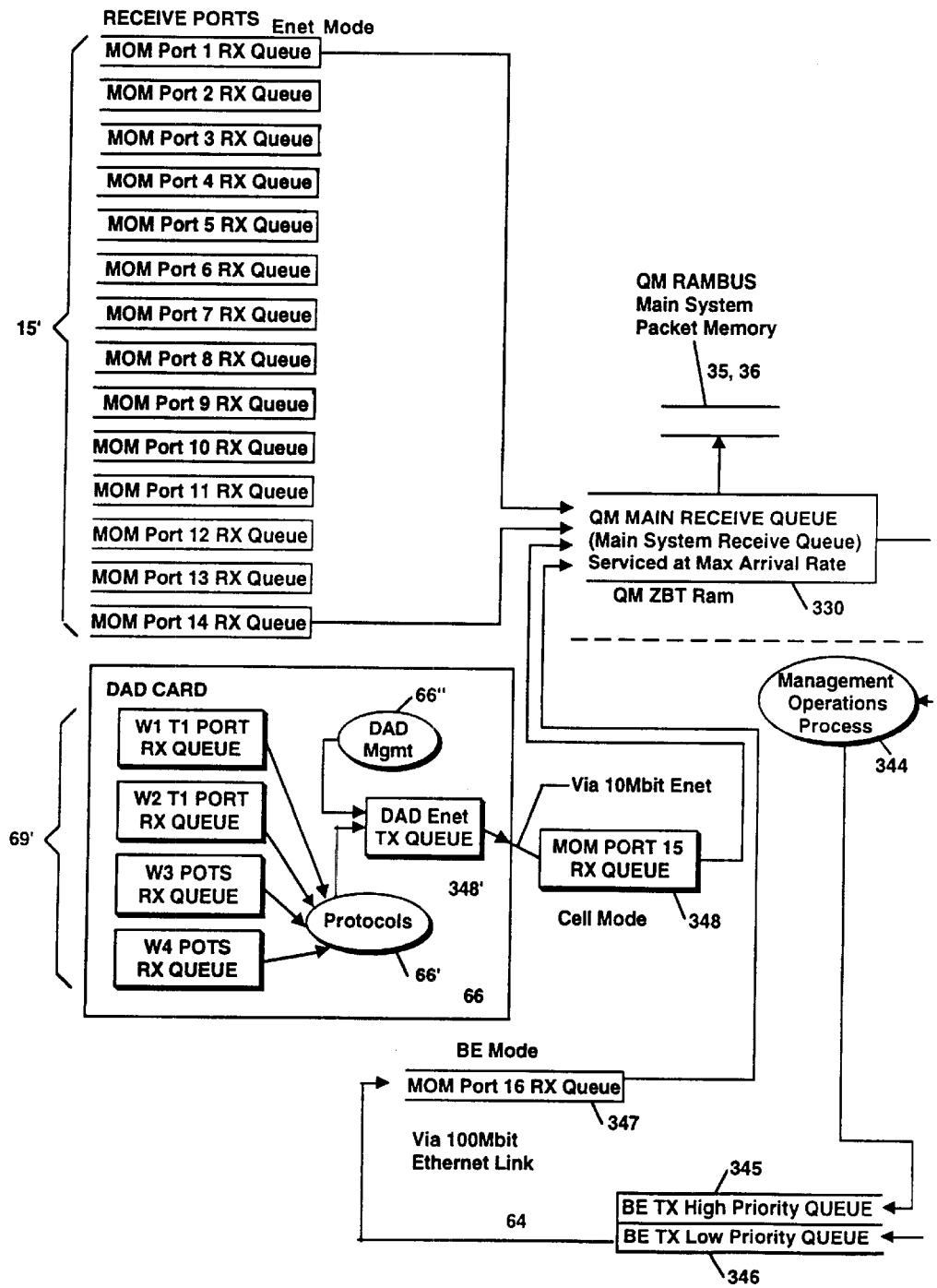
FIG. 5 is a schematic diagram of the data flow of the preferred embodiment of the invention.
Figure 5A:
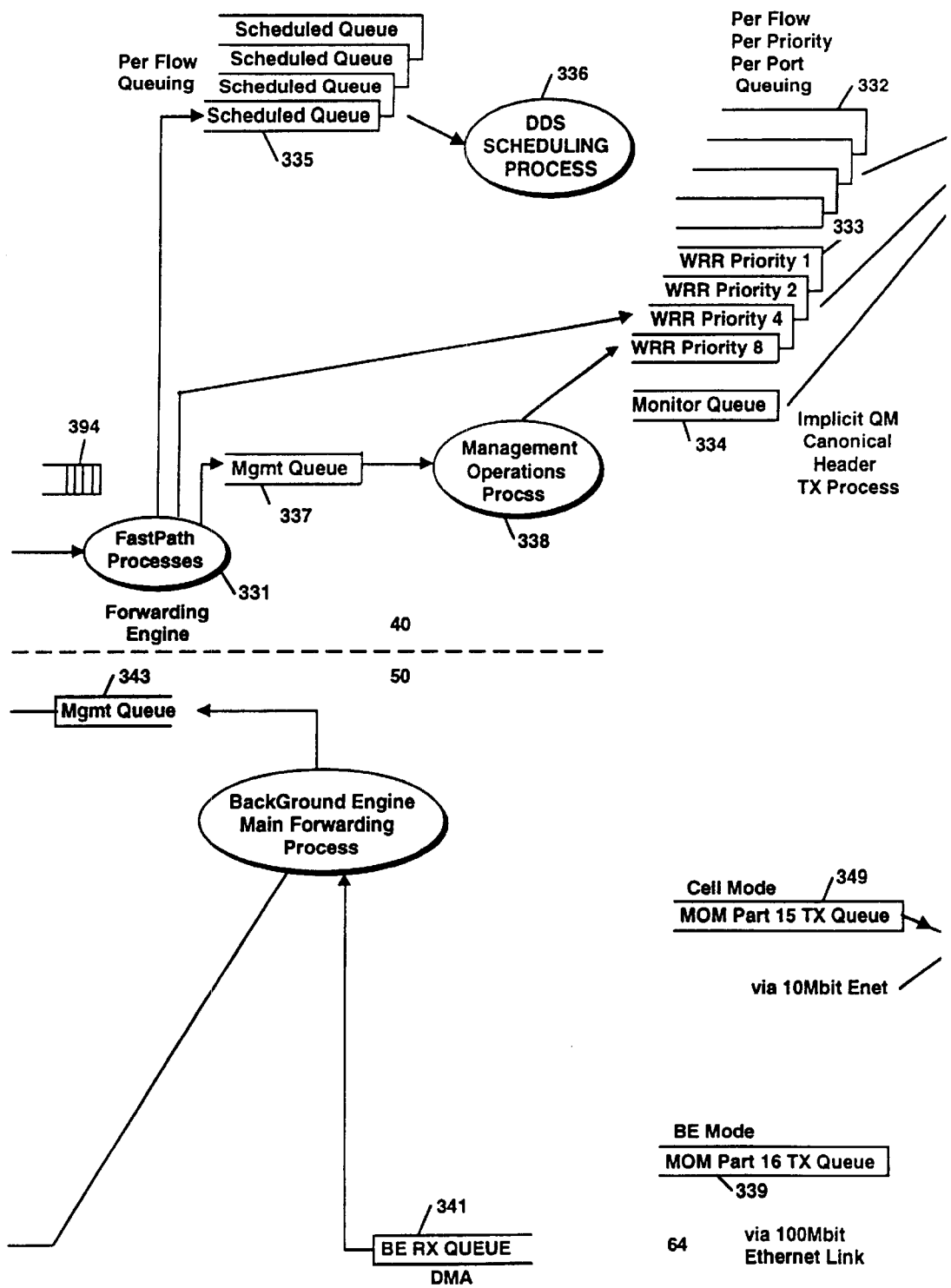
Figure 5B:
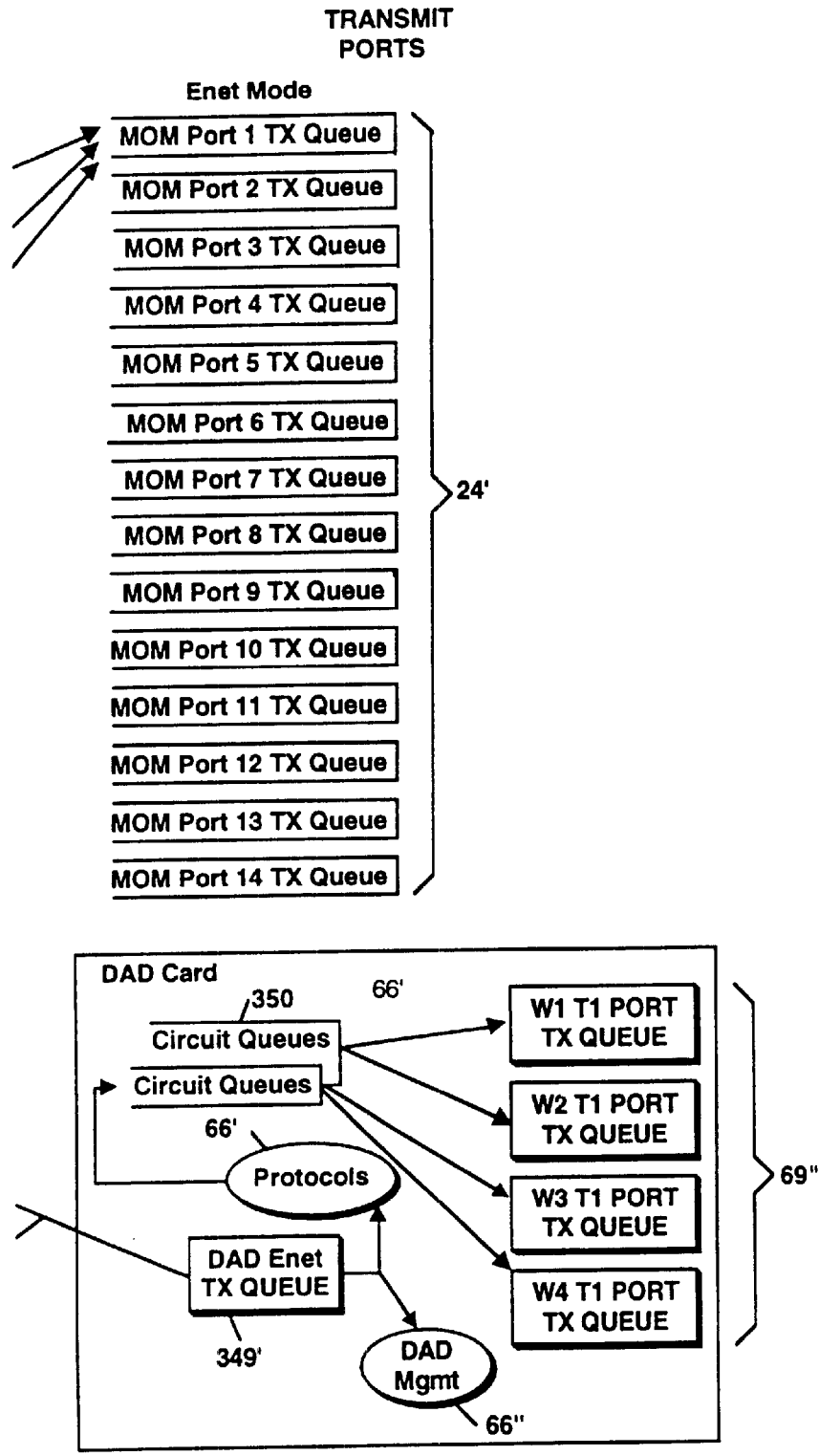

FIG. 5 shows a general schematic of the operation of the preferred embodiment of the invention from the queue management point of view. Data on MOM Receive Ports 15' are directed into the QM Main Receive FIFO 330. Also enqueued are data from WAN (T1 and POTS) port receive queues 69' processed under protocols 66' and under the direction of DAD Management 66" into a DAD Ethernet transmit queue 348' to appear on a MOM receive port 348. Data cells in the Receive FIFO 330 are placed in the main system packet memory DRAMs 35 and 36 while the canonical headers are forwarded in a FIFO 394 to the QM 30 where FastPath™ processes are applied to enable appropriate queuing of packets on per flow, per priority and per port queues 332 (static priority, as discussed below) and 333 (weighted robin priority, as discussed below) to be transmitted to the MOM Transmit Ports 24' (or the DAD 66 to be distributed on circuit queues 350 for further distribution to T1 and POTS Port Transmit Queues 69") for transmission. Fine tuning of scheduling may be achieved using Quality of Service Scheduling Process 336 relative to per flow queuing using Scheduled Queues 335 as "intermediate" queues. A Management Queue 337 is also provided with a Management Operations Process 338 operating on weighted round robin queues 333. A Monitor Queue 334 is also provided for network monitoring information to be transmitted over MIIs 24'. On the BE 50 side, data placed on the MOM Port Transmit Queue 339 is transmitted over MII (100 Mbit Ethernet) link 64 into the BE Receive Queue 341. The Background Engine Main Forwarding Process 342 passes information into the BE Transmit Low Priority Queue 346 or the Management Queue 343 which is serviced by Management Operations Process 344 to develop data (including instructions) to be placed on BE Transmit High Priority Queue 345. Both BE Transmit Queues are drained into the MOM Port Receive Queue 347 via link 64 to be placed on the QM Receive Queue 330.

FIG. 6 is a generalized flow diagram for the process of the invention. It is to be understood that the processes occur simultaneously along various points in the diagram for different cells. Because the preferred embodiment of the invention divides often lengthy incoming Ethernet frames into cells for subsequent reassembly, it is important in the embodiment to characterize the cells relative to the packet from which it originated. A received cell may be a "start of packet" ("SOP") a "middle of packet" ("MOP"), an "end of packet" ("EOP"), or include a single packet as a "start and end of packet" ("SEP"). Because reception and transmission of data packets in the preferred embodiment is executed on a circuit-by-circuit basis, and a circuit is defined as a logical connection preserving the order of packets, cells of a packet on one circuit may be interleaved with cells of a packet on another circuit, for example on the MAC bus, but cells received on the same circuit must be transmitted in the same order. Thus, in FIG. 6A, with time going forward from top to bottom, an SOP 371 is received from Circuit 2, then an SEP 372 from Circuit 1, an SOP 373 from Circuit 3, an MOP 374 from Circuit 2, an EOP 376 from Circuit 3, an SOP 375 from Circuit 1 and an EOP 377 from Circuit 3, in order of appearance on the MAC bus.

Referring to the generalized process shown in FIG. 1, in operation 351, a packet is received at an MII and is split at operation 352 into cells by MOM 10 or 20 (referring to FIG. 1) which also adds canonical headers (and possibly burst headers). The cells in MOM Transmit buffers are arbitrated on the MAC bus in operation 353 and stored in DRAM for later transmission in operation 354, which also includes the development of a procedure to associate the cells with the original packets, such as the link-list of virtual packets used in the preferred embodiment of the invention. If the cell is an SOP, a decision 355 is made to send the cell to a pattern matching procedure wherein the cell is hashed 356 and then matched 357 against known hash results associated with previously identified flows. If there is no match (possibly after several matching procedures), a new flow or exception is noted 358. In either case, an appropriate header is written 354 to appropriately schedule and route the packet. In the preferred embodiment, the scheduling is done by assignment of the packet to a queue associated with a specified quality of service and a particular circuit. A cell on a queue is transmitted 360 at the appropriate time, the process possibly including a rewriting of the headers. If the transmitted cell was an EOP, the packet is dequeued 361 from the circuit and if there are no other requirements for transmission of the packet (no more owners 362), the data buffer is released 363. This process may be further generalized and implemented in a diverse ways.

The flow of data through a preferred embodiment of the invention is presented below in further detail, which includes additional inventions.

2. Header "Canonicalization" and Frame "Cellularization"

Upon receiving a data packet on a physical link, the inventive network switch takes the Layers 2 and 3 headers of incoming packets (dropping any Layer 1 packet preamble) and converts it to canonical form. The invention further breaks variable-length packets into "cells" of a maximum convenient length for communication on the high-speed internal bus. This allows data packets of different lengths with different Layer 2 and 3 header formats, such as Ethernet "frames" or ATM "cells," to be routed by the same switching process and apparatus. The "canonicalization" of the header also aligns the header along 4-byte boundaries that are convenient for processing. The example here is for Ethernet frames, but is applicable to ATM cells with appropriate modification in the terminology and the interface ASIC.

Referring to FIG. 1, a frame of information is received by the MOM 1 chip 10 via one of the eight ports shown. The physical link Layer 1 processing is handled in the preferred embodiment by dual "off-the-shelf" Quad PHY integrated circuits (such as available from Lucent Technologies), each handling the transmit/receive electronics of 10-Base-T (10 Mbit/sec) or 100-Base-TX (100 Mbit/sec) Ethernet. One of the ports, e.g., from MOM 2, may be connected by internal or external 10 Mbit Ethernet to a DAD integrated circuit including an off-the-shelf WAN processor (such as available from Motorola), which in turn interfaces with T1 and POTS" lines via modem. Together, these form a QuadServe™ WAN access module.

Figure 18:
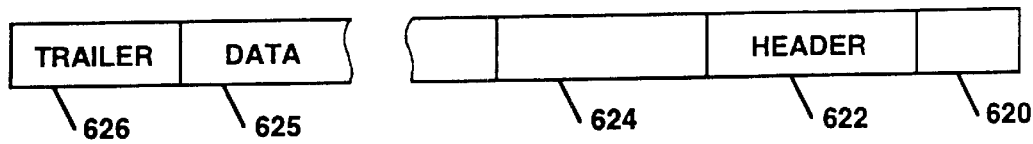
FIG. 18 shows a sequence of cell transmissions used in the preferred embodiment of the invention.

Referring to FIG. 1, a frame or packet of information in the form of a data stream forming a message is input to a physical circuit 70 and then received by the MOM 1 chip 10 via one of its eight ports. FIG. 18 schematically illustrates the organization of a typical packet format. There may be a preamble 620, followed by a data link Layer 2 header 622, which contains information to bridge the packet, a network Layer 3 header 623, which contains information to route the message, and an application header 624, which contains information about the application for which the data is used. The headers are followed by the data itself 625, and, occasionally, there is a trailer 626, which usually is superfluous and not used.

The MOM 1 chip, preprogrammed in hardware in the preferred embodiment to recognize a variety of Ethernet protocols, drops the preamble and trailer, reads the Layers 2 and 3 headers from the received frame, and generates a canonical header of twenty-eight bytes, FIG. 7A. Having a buffer capacity of 256 bytes per port, the MOM 1 segments the frame data into cells of 128 bytes each (other cell lengths may be used in other embodiments).

Immediately adjoining the canonical header, Layer 3 (network) header information as received is stored. The Layer 3 header always starts at a multiple of four bytes from the start of the cell because the canonical header is 28 bytes. Important fields within the Layer 3 header are aligned at four-byte boundaries generally. This makes the processing of these fields very efficient for 32-bit processor/memory architectures.

Other header information from the higher layers, including the application layer, follow the Layer 3 header. The canonical header is placed at the beginning of the first cell of each frame or packet received and is used by the RE 40 to route or bridge the packet. When a packet in the form of a stream of cells is sent to the MOM for transmission, the MOM reconstructs the appropriate headers, preambles and trailers according to the destination and protocol information in the transmit canonical header and begins transmitting the reconstructed packet on the line connected to the designated port.

FIG. 7A shows the organization and content of the canonical header in a preferred embodiment. The first two bytes 430 hold the circuit identification of the circuit on which the data packet was received, Byte 432, DL Info, provides information about the Data Link (Layer 2) header from the original received header. FIG. 7B shows the specific assignments to these bits. Bit 7 indicates whether the received frame was VLAN (virtual local area network) tagged on reception. On transmission, if this bit is set, the outgoing packet is encapsulated with a VLAN header by the MOM chip handling the transmission. It should be noted, however, that packets received with VLAN tags are not necessarily sent out with VLAN tags and vice-versa.

Bits 6 and 5 of FIG. 7B indicate how CRCs (cyclical redundancy checks) are to be handled. FIG. 7C is self-explanatory. Of note is that when the outgoing frame is different from the received frame, then a new CRC must be generated, but if the original frame is simply forwarded, then the CRC may not change, hence there is need to retain the old CRC or generate another CRC. Bits 4 and 3 are unused and left as zeros. FIG. 7D shows the encoding for bits 2, 1, and 0 which identify the data link packet format.

The canonical header NL Info field 434 contains network layer information. FIG. 8A shows the meaning of the eight bits in the NL Info. Regarding reception: bit 7 true indicates that the destination address (DA) of the received information is the address of the bridge group associated with the circuit on which the packet was received; bit 6 true indicates that the DA is the system's address for the port; bit 5 true indicates that the DA is an address that has been pre-configured by the invention as a "well-known address," such as one associated with a network control protocol. On transmission this bit is ignored. On transmission, if bits 7 and 6 are set, the appropriate source address is put on the SA field Bits 4-0 identify the Layer 3 protocol of the packet. FIG. 8B identifies those protocols preprogrammed into the invention. These can be extended as new protocols are developed and need to be handled efficiently by the system.

The Time Stamp four bytes 138 contain the time at which the packet will expire. The QM 30 enters the time that the packet will expire when it receives the canonical header as part of the first cell of a packet. The QM 30 upon transmitting a packet will check if the current time is greater than the time stamp value in the canonical header. If so, the data link device is directed to not transmit the packet and count it instead. When first generated by the MOM, this field contains cell information described in the "Data Flow In" section below.

The two-byte receive circuit identification (Rx Ckt Id) identifies the circuit on which the packet is received. The QM copies the receive circuit identification from the Ckt Id field 430 first supplied by MOM 1 before overwriting the Ckt Id field 430 with the circuit identification of the circuit on which the data is retransmitted. The receive circuit identification is thus retained for later use (such as for management and RMON functions by the BE 50).

DA is a 48-bit Layer 2 (MAC) destination address of the received packet.

SA is a 48-bit Layer 2 (MAC) source address of the received packet

VLAN tag is a two-byte field to accommodate a packet received with an Ethernet 802.1Q tag. The VLAN tag bit in the DL Info field is also set, as described above. The MOM chip handling the transmission of this packet will tag the outgoing packet.

P-Type/len is a two-byte field containing the protocol type/length field. In this preferred embodiment, if the value is greater than 1500(decimal), this field represents a protocol, and if the value is less than or equal to 1500, this field represents a length. Protocol is captured in the Protocol Kind subfield of the NL Info field. If the protocol is not so configured, the Protocol Kind subfield of the NL Info field would indicate Unknown (0) and the P-Type/len field would have the value. For example, if the packet was in the Ethernet 802.3 format, this field would contain the length which could be used for validity checks with length in the Layer 3 header.

The XX bytes may have other information based on the packet format of the received packet. FIG. 8C shows the contents of the XX bytes for the different DL format types.

3. BlazeWire™ High Speed MAC Bus

The received frame, reorganized into one or more cells, the first cell containing the canonical header and higher layer headers, is communicated to and from the QM on a high speed MAC bus called BlazeWire™.

The present design of BlazeWire™ is a full-duplex, clocked bus of ten signals and a clock signal each way between two large integrated circuit chips. The clocking protocol allows data transmission on the bus to be self-framing, asynchronous and non-aliasing. All the signals are differential signals between two conductor runs with the inherent transmission lines properly terminated. In this preferred embodiment, the electrical characteristics of the differential drivers and receivers are as substantially described in the low voltage differential standard (LVDS) ANSI/TIA/EIA-644. The differential signal voltage is about two hundred and fifty millivolts (250 mv), and the cable terminations and physical signal paths are arranged and designed to accommodate high speed operations over the bus. The bus is organized as a chain running from one large chip (MOM or QM) to another. A separate daisy chain token passing scheme is implemented as discussed below to control the access of the chips to the bus. The electronic design of the bus compensates for the practical variations inherent in different production runs of chips from possibly different manufacturers, supply voltage variations, and temperature variations. In preferred embodiments the speed of the bus can run upwards to the gigaHertz range.

The ten signals are composed of eight data, one parity, and one control. The data are placed on the lines on both the rising and falling edges of the clock signal. Since the data is placed on the signal lines at the clock transitions, the signals should be read at the receiving end at or very near the center of the clock signal. This allows any overshoots and any other signal delays or other anomalies to settle. Since the data is loaded onto the signal lines at both clock signal transitions, it is critical to have a symmetrical clock with minimum skew between the clock edges and the data being placed on the bus. The present circuitry provides a feedback mechanism for monitoring and finding the center of both phases of the clock signal, and furthermore to provide a symmetrical clock for the signals being sent out on the continuation of the bus through the chip.

Figure 9:
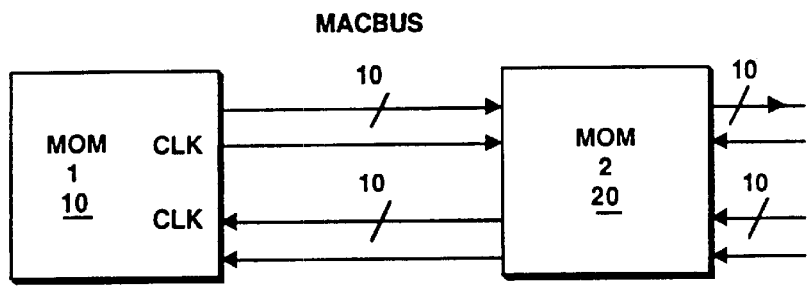
FIG. 9 is a block diagram of the high-speed bus used in the preferred embodiment of the invention.
Figure 10:
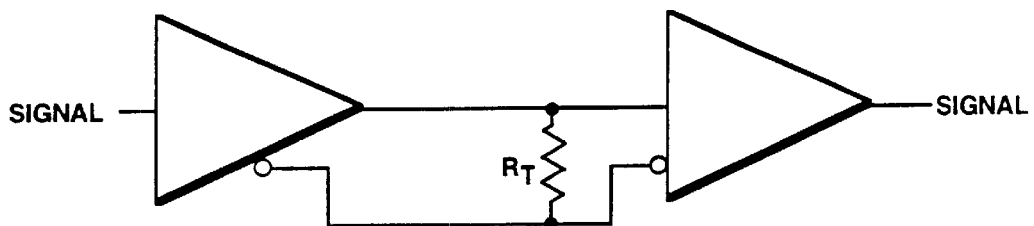
FIG. 10 shows the differential character of the bus lines of FIG. 9.

FIG. 9 diagrammatically shows the basic signal flows between two sub-systems represented as MOM 1 and MOM 2 with twenty signal lines, a group of ten each way, and a clock with each group. FIG. 10 shows the differential character of each of the twenty-two lines. Differential drivers and receivers as known in the art are properly terminating the transmission lines in their characteristic impedance to maximize signal fidelity and minimize ringing. Other termination schemes such as schemes implemented on the drive side may be used to advantage in other embodiments.

Figure 11:
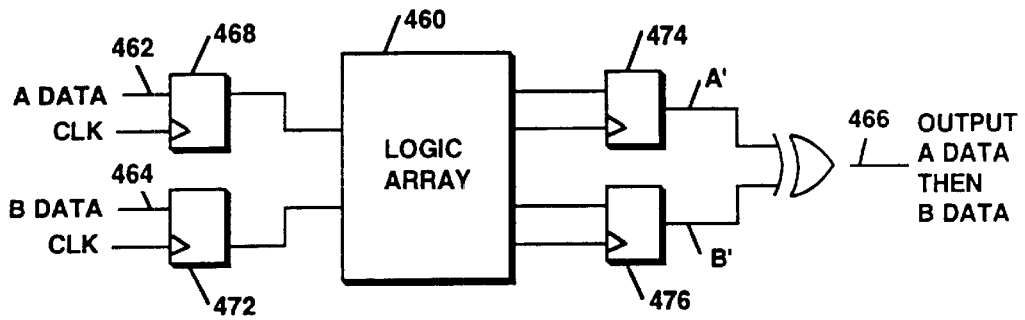
FIG. 11 is a schematic of a transmit circuit used on the bus shown in FIG. 9.
Figure 12:
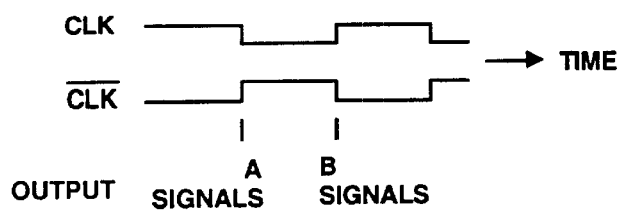
FIG. 12 is a timing diagram of the transmit circuit of FIG. 11.

FIG. 11 is a schematic of the circuitry by which one of the ten data bits is output from one of the MOMs. The circuitry is essentially duplicated for the other data bits. This circuit implementation maximizes clock symmetry and minimizes skew. The A data 462 is to be placed on the output 466 followed by the B data 464. The A data is latched in the flop 468 and presented to the logic array. Consider that the prior B data has remained in the latch 472 and is input to the logic array 460. The logic array is arranged to load a signal into the latch 474 which provides, when it is "exclusive or'ed" with the signal that remained in latch 476, the A signal at the output of the gate 466. On the next clock edge a similar operation provides the B data signal at the output, the B data 464 is latched 472 and "exclusive or' ed" with the prior signal in latch 474 such that the "exclusive or" of the data in latch 476 will provide the B signal at the output of the "exclusive or" 466. FIG. 12 is a simplified timing diagram of the above.

Figure 12A:
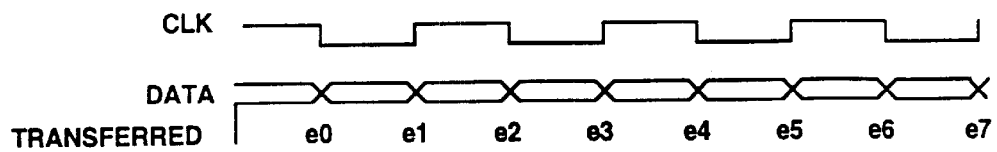
FIG. 12A is a composite timing of the transmit circuit of FIG. 11.

FIG. 12A shows a composite timing chart of the bus clock and the ten data lines on the bus between MOMs 1 and 2. FIG. 12A shows the transferring of eight consecutive bytes (plus parity and control) on each edge of the clock signal.

When the signals are received at the MOM or QM, FIG. 13 shows the MOM's circuitry which is used to provide a delayed clock with an edge at the center of one phase of the received clock. Another similar circuit is used to provide a delayed clock with an edge at the center of the other phase of the received clock. These centered clocks are used to latch the data into the receive MOM and will be the basis for the symmetrical clock used to send out signals from the MOM. The received clock 80 becomes the data input to the latch 482 and latch 484. A delayed clock DLYA (a delay version of the input clock) latches the clock signal 480 into the latch 482 whose output is SAMPLE CLK A, and a delayed clock DLYB latches the clock signal 480 into the latch 484 with an output SAMPLE CLK B. The DLYA and DLYB are delayed by the control logic by a programmable amount. Both of these SAMPLE CLKs are fed back to a control logic array 90 through circuitry designed to synchronize the signals. In operation, the control logic can program when the DLYA occurs. In this way, the DLYA might latch the clock 480 signal when it is low which the control logic can determine by the SAMPLE CLK A signal. The control logic continues to set different delays until the clock 480 signal goes high. In a similar manner, the control logic continues to set different delays until the clock signal goes back low. As before, the control logic determines this condition from monitoring the SAMPLE CLK A signal. With reference to FIG. 13A, once the control logic has found the first rising edge 480' and the falling edge 480" of the clock signal 480, the control logic "knows" and can set the DLYA rising edge 486 at the center of the positive phase of the clock 480. This DLYA rising signal will be, effectively, the rising edge 486' used to latch data on the next successive positive phase of the clock 480. During the time that the centering of the DLYA signal, the actual data being received at the time 486, FIG. 13A, is latched by the DLYB, FIG. 13, signal which had previously been centered to the positive phase of the clock 480. The previous centering of the DLYB was accomplished in the same manner as described above using the SAMPLE CLK B feedback signal and the DLYB delayed signal. In this embodiment, while one delayed clock is latching data, the other delayed clock is being centered for use at some later time.

The circuitry of FIG. 13 is duplicated to precisely measure the center of the negative phase of the input clock signal in order to latch in the data on the opposite phase. FIG. 13 shows the DLYC rising edge 489 precisely at the center of the negative phase of the received clock. As previously described, the DLYC clock is being centered during one negative phase of the clock 480 while the other (DLYD not shown) is latching data, and the DLYD will be centered while the DLYC clock latches data.

FIG. 14 shows parts of the delay circuitry. The IN signal 494 is delayed by one gate 495 and input to the "and" gate 496. If the control 1 signal is a logic one, the signal traverses 96 and is output via the "or" structure 498 and becomes the output signal delayed by the three gate delays—495, 496, and 498. This delay is considered as a one unit delay. If the control 1 signal is a logic "0" and control 2 signal is a logic "1", the IN signal travels through gates 495 , 495', 496', 498' and 498. This path is longer by two gates, and the IN signal is considered to have gone through two single unit delay circuits. Each single delay unit adds two gate delays. If the control logic allows the IN signal to reach the three gates 500, and the control X signal is a logic one, the IN signal will go through an incremental of four gates—the three gates 500 and the gate 504 (gate 502 being the common path duplicated in each delay circuit and disabled in prior delay circuits). This circuit adds four gate delays and forms a two unit delay. A four-unit delay (not shown) will replace the three gates 500 with seven gates, therefore adding an increment of eight gate delays or four unit delays. In this preferred embodiment, there are thirty-two single-unit delays, sixteen two-unit delays, and sixteen four-unit delays. The arrangement in this preferred embodiment allows an arithmetic-like progression of delays up to a total of 128 unit delays which may be selected. In other embodiments other arrangements of delay circuits may be selected and other known delay circuits may be used to advantage. In this preferred embodiment, for expected manufacturing processes used to build the circuitry, and for expected temperature and supply voltage operation, a single unit delay will be about 0.15 nsec. It is expected that the variation of one unit delay may run from 0.08 to 0.3 nsec depending on the above mentioned parameters.

FIG. 15 (Table 1) is a table indicating the use of the control bit in this preferred embodiment. The bit is used for framing purposes. In the timing diagram of FIG. 12A, eight bytes are transferred on each clock transition marked by e0–e7. Table 1 shows the value of the control bit for the even numbers transitions, e0, e2, e4, and e6. The combinations indicate the allowable functions shown in the right most column. If the control bit is zero in each of the even transitions, the bus is idling. Any of the combinations shown in rows 510 signal that the data on the data lines is a valid frame. In particular, since the value at the e6 time is always zero and the value at e0 time is always one for a valid frame of data, the system looks for a zero to one time sequence of the control bit. The one is assumed at e0, and if the combinations shown in rows 510 exists, the framing of the data shows a valid set of eight bytes.

The values of rows 510 are selected to ensure that no aliasing of valid frames of eight data bytes can occur. The valid control bit sequence combinations—the rows 510, in FIG. 15—will always have a zero then a one, with no other zero/one patterns in a valid frame. FIG. 16 shows that the pattern of control bit values at the even clock transition shows frame 512 as invalid since there is another zero/one at e2 and e4 for that frame 512. The frame 514, however, is valid as is frame 516. In practice, the value of the control bit is measured at each receive clock phase and a zero to one transition separated by a clock phase is monitored. When such a transition occurs, the one is treated as being in the e0 time slot and the monitoring of frame validity is based on that relative timing.

Transmission of data from the MOM chips to the QM is arbitrated by a token ring in the preferred embodiment. With reference back to the system block/schematic diagram FIG. 1, a token ring arbitration path 61 is shown between MOM 1 and MOM 2. The token ring is a looped signal where a chip has the token when there is a logic difference between the incoming token signal and the outgoing token signal. In FIG. 17, there is no net inversion within the chips, so there is an inverter in the path so that at initialization one chip, in this case MOM 1, will be guaranteed to have the token and be in control of the bus. When a chip has the token, it can send its own data over the bus, whereas when the chip does not have the token, it must wait for the token while other data are simply passed through the chip. When a chip has the token, it will send out all the data needing to be sent by that chip before releasing the token. If MOM 1 has the token, it is passed to MOM 2 by MOM 1 changing the state of its output signal 61. MOM 2 then has the token.

This token passing may be extended to multiple devices by connection of the single token output signal of one device to the single token input signal of the next device. The last device's token output signal is inverted and then sent to the first device in the token passing chain.

Implementation of the token passing at an edge or change of state of the information facilitates synchronization between different clock domains. The token automatically, by virtue of the edge-based information passing, remains valid at a device until it is recognized and then passed on to the next device in the token passing chain.

4. Data Flow In

The MOM 1 chip 10 can store or buffer up to two cells or 256 bytes of received data for each of the eight ports. As described in the "Header Canonicalization" section above, the MOM chip reads the Layer 2 and 3 headers from the received frame or packet and generates an initial canonical header of twenty-eight bytes (described further in this section), followed by the network Layer 3 header and the application layer header in the first cell processed.

The MOM 10 (or 20) transmits the cell on the high-speed MAC bus 60 to the QM 30 when the MOM holds the token of the token ring arbitration path described above. Between the eight ports of a MOM, arbitration is round robin. The QM receives the cell and stores the cell in dynamic RAMs 35 and 36, in this preferred embodiment a RAMBUS® DRAM having two banks of DRAMs rapidly accessed as described in Section 9 below. Information describing a received, stored cell is placed in SRAM 32 and is called "descriptors." The canonical header is modified to include the Time Stamp. The modified canonical header and the rest of the header information in the first cell of the packet is placed in a Header Out FIFO 309 for transfer to the RE 40.

Because of the segmentation of frames and the arbitration scheme, subsequent cells of a packet received on a circuit may be interleaved with cells of other packets received on other circuits. To provide information to allow the QM to keep track of the order of the cells of a packet, the MOM writes an eight-byte (octbyte) "burst" header added to subsequent cells of the same packet (making up to 17 octbytes), corresponding to the first octbyte of the initial canonical header of the first cell of the packet.

Figures 21, 22:
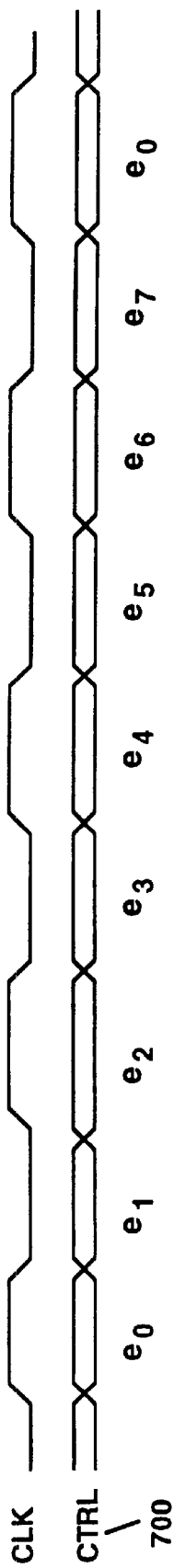
FIG. 21 is a timing diagram for the control signals used on the bus shown in FIG. 9.
FIG. 22 shows possible values and meanings of control bits used on the bus shown in FIG. 9.

Additional information is sent on the control signal line or bit of the high-speed MAC bus that allows identification of the boundaries of the cell and the type of information contained in the cell. FIG. 21 shows the use of the control bit to delineate data in groups of octbytes. The control bit 700 over eight consecutive clock phases frames eight bytes and distinguishes the data. The value of the control bit is shown as e0 through e7 in the table FIG. 22.

Figures 23, 25:
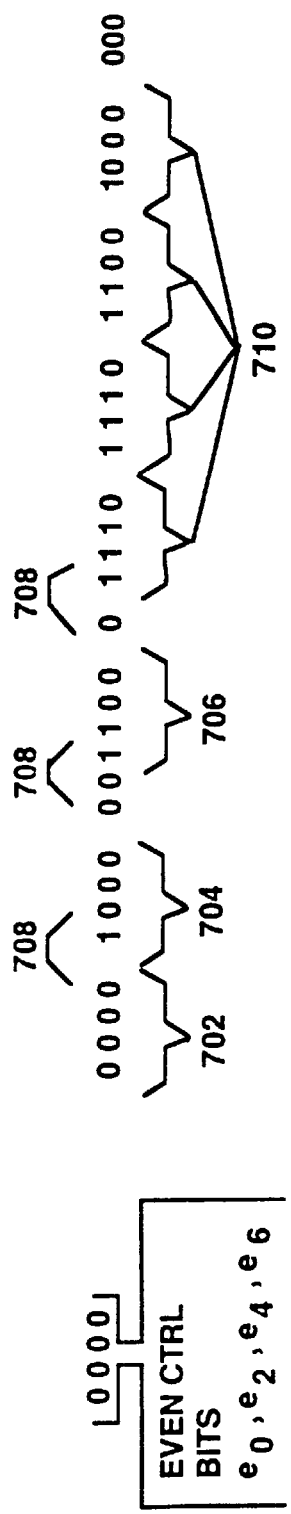
FIG. 23 shows as an example a sequence of control bits that may be seen on the bus shown in FIG. 9.
FIG. 25 shows the possible values and meanings for codes used on the bus shown in FIG. 9.

In FIG. 22, the even control bits, e0, e2, e4, and e6 are encoded as follows: e0 is always a one and e6 is always a zero to indicate that a valid group of eight bytes is received. To prevent aliasing of this encoding, the only values indicating a valid group are (for the even control bits, e0 through e6): 1000; 1100; and 1110. The bit e2 indicates the start of a cell, and e4 indicates the start of a packet. FIG. 23 shows a possible sequence of the even control bits: group 702 is not a valid group, while groups 704, 708 and 710 are valid. The circled zero/one 708 indicates that the only possible beginning to a valid group must have a zero followed directly by a one, and there cannot be another zero/one in the next two bits (e2 and e4).

Still referring to FIG. 22, the odd control bits are encoded as follows: e1 indicates a transmission credit (see discussion below) exists, e3 (code bit 0) and e5 (code bit 1) form a two-bit end code, and e7 (short word) indicates an octbyte containing fewer than eight meaningful bytes. The short word can be used at the start of a cell or at the end of a cell.

Figure 24:
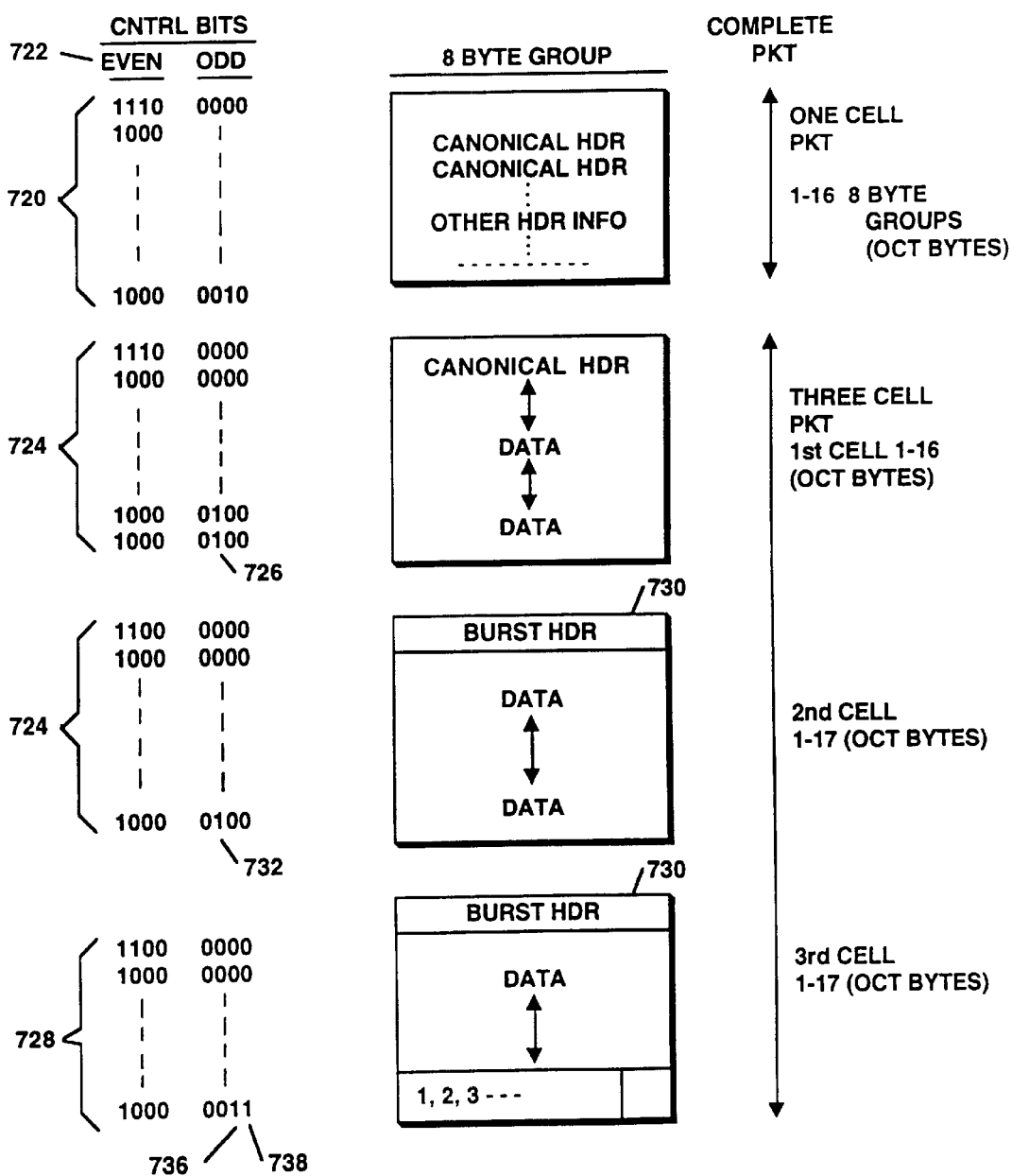
FIG. 24 shows diagrammatically the cell transmissions for possible cells transmitted on the bus shown in FIG. 9.

FIG. 24 is a chart of several packet types that may be encountered. The first cell 720 of the packet may have up to sixteen octbytes, or 128 bytes. The even control bits 722 for the first 32-bit word (octbyte) is 1110. As shown in FIG. 22, this code means that this octbyte is part of a valid first cell of a packet. As shown, e0 equal to "1" is required for a valid cell; e2 equal to "1" means this eight-byte transfer is the start of a cell, e4 equal to "1" means it is the start of a packet, and e6 must be zero for a valid cell. For the cell 720, the odd control bits are all zeros except for bit e5 of the last eight-byte transfer, which is a "1". FIG. 25 shows the encoding of the control bits e1, e3, e5, and e7—the odd control bits. For cell 720, e5 is a "1" and e3 is a "0" which decodes into "end of packet." Thus cell 720 is a one-cell packet (SEP). It should be noted that this cell need not be a full 128 bytes long.

Cell 724 is a valid starting cell of a packet, and here e3 of the odd control bits 726 is set meaning "end of cell" but not "end of packet"; thus, it is an SOP cell. The next cell 728 is the second cell of a packet (MOP), and all the cells following an SOP cell will have up to seventeen octbytes, including an octbyte burst header 330 added to the beginning of each cell. For this second cell, the last octbyte e3 is set meaning this cell is the end of a cell, but not the end of the packet. The cell 734 has e5 set in the last eight byte group, meaning that this cell is the end of the packet (EOP), and in this instance, e7 is also set. The bit e7 means that the last group of eight was not filled and was a "short word" (as so labeled in FIG. 25), and when this happens, the last byte 338 contains the number of valid bytes in the last eight byte group. For example, if there were only three valid bytes in the last group, the last byte (concurrent with the e7 control bit), would contain 1100, or decimal three.

Regarding the transmission of cells to the QM from the MOM chip, the first octbyte at the start of the first cell contains a portion of the canonical header that is modified by the QM to include the Time Stamp. The entire canonical header is stored in the DRAM with the other headers and such frame data as may fit in the remainder of the 128 bytes.

FIG. 26 shows the transformation of the first octbyte of the canonical header by the QM. As shown, the initial four bytes 740 written by the MOM, the Ckt Id, DL Info and NL Info, are carried forward by the QM. The second four bytes 742, including cell information, is overwritten by the QM with the Time Stamp 748. (The canonical header is sent to the RE, which deals only with packet policy and is unconcerned with cell information.)

The first byte 744 of the cell information bytes 742 contains the number of transmission credits being reported from the QM (described in the "Transmission Credit Scheme" section below). The second byte contains credit flags, bit 7 being a SYNCH flag (for initialization) and bit 6 a "parent" flag (described in Section 8 below) The third byte provides cell information whose meanings are shown in FIG. 27. The bit meanings are: bit 7 indicates cell error; bit 6 packet time out; bit 5 a packet from the bad packet queue; bit 4 from the monitor queue; and bits 3-0 are selected bits from the control described above. Bit 3 is the packet end bit, bit 2 is the start of packet bit, bit 1 is the data cell bit, and bit zero is the transmit credit bit. The last byte in the cell information bytes 742 provides the cell length in number of bytes.

The octbyte-long burst header used to track cells without canonical headers is shown in FIG. 28. Its fields are identical to those of the first octbyte of the initial canonical header except that DL Info and NL Info (used by the RE which only sees the SOP) is replaced by the cell sequence number 752 and unused space. The Ckt Id 750 is used to match the cell (or more specifically, its proxy, the buffer descriptor) with preceding cells having the same Ckt Id, which should have sequential sequence numbers (unless a cell has been discarded). Once the cell is linked by the QM with preceding cells (as described below), the credits entered, and action taken on the other cell information, the burst header is no longer needed and is dropped. (A cell may be discarded if parity information detects an error. In such cases, at this time the cell and finally the packet is aborted by signaling the MOM chip.) A new burst header is created for the cell by the QM in the transmit phase, where the CKT ID shows where the packet is being sent.

5. QM Buffer and Queue Structure and Operation

Data cells received on the MAC bus by the QM are individually stored in the RAMBUS® DRAMs according to the fast-access operation described in Section 9 below, in addressable 128-byte data buffers, with the canonical header intact but rewritten to include the Time Stamp, and with the burst header octbyte dropped. Address00000 does not contain cell information and corresponds to a null-pointer.

All data cells received on the MAC bus and stored in data buffers are organized in a single virtual receive queue using a descriptor/pointer scheme that is used for all but a handful of specialized queues for exceptions. The scheme allows a receive queue corresponding to up to 1 Gbytes of data.

In the descriptor/pointer scheme, data buffer "descriptors" in the QM SRAM, comprising two 4-byte words, are surrogates for the actual data stored in the buffers and are linked to form logical packets. Thus a descriptor assigned to a data buffer with data has a field in the first word indicating the address of the buffer in the DRAM in which the associated cell is stored and a field in the second word containing a pointer to another descriptor 802 in the SRAM associated with the next cell of the same packet. As shown in FIG. 29, a complete multi-cell packet is described by a descriptor "link-list," with the second word of the SOP buffer descriptor 801 pointing to the MOP buffer descriptor 802, the second word of descriptor 802 pointing to EOP buffer descriptor 803 and the second word of descriptor 803, associated with the last cell of the packet, containing a pointer pointing to descriptor 801, associated with the first cell of the packet. As shown in FIG. 29B, an incomplete packet has a null pointer in the second word of descriptor 805.

Figure 30:
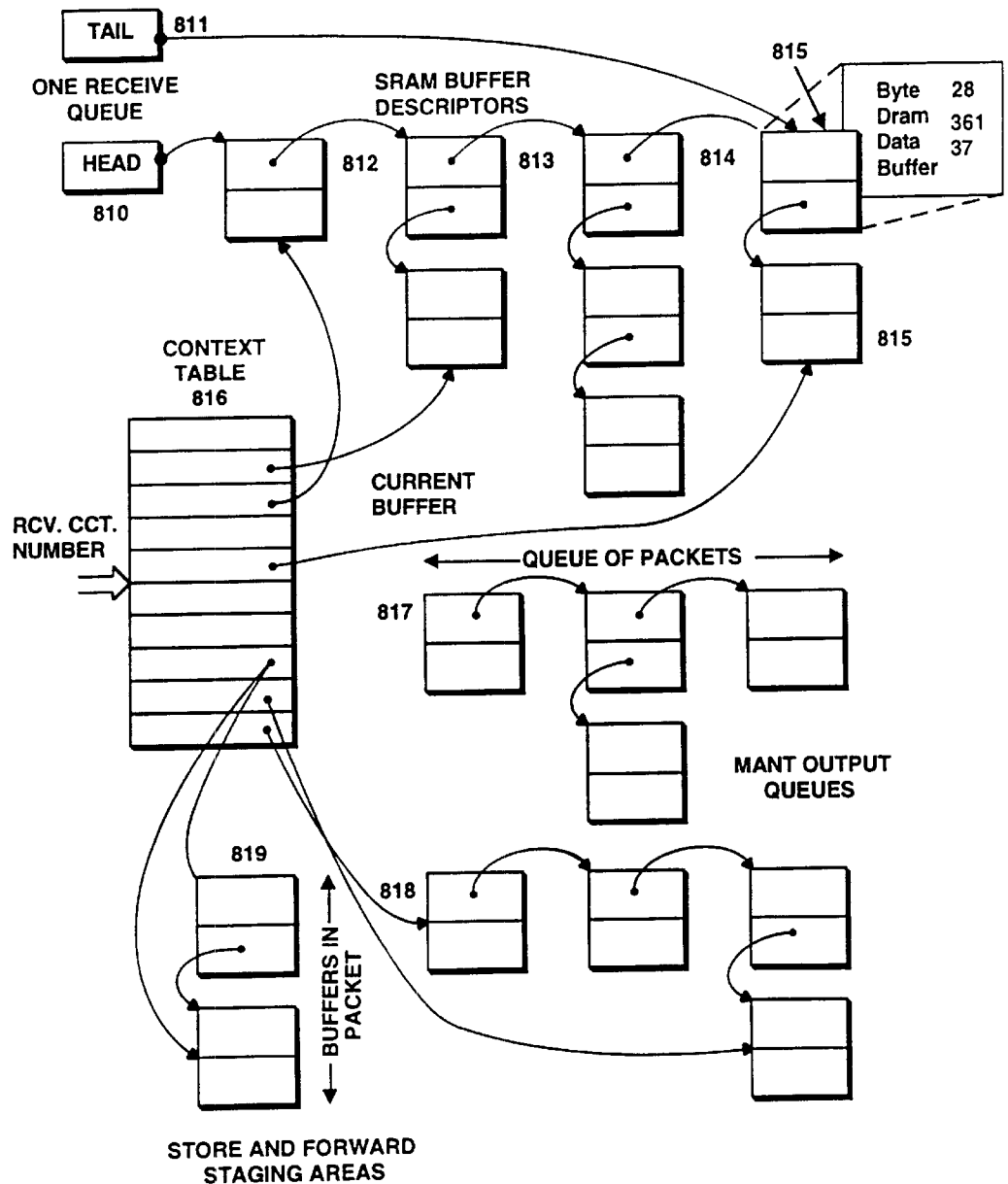
FIG. 30 shows the linking of descriptors used in the preferred embodiment to establish virtual queues.

Queues are formed in the invention by a queue head pointer pointing to the first word of the descriptor associated with the first cell of the first packet in the queue and with a field in that first word pointing to the first word of the descriptor associated with the first cell of the next packet in the queue, and so linked reiteratively until the last packet in the queue, which has a queue tail pointer pointing to it, as shown in FIG. 30 with the receive queue head pointer pointing to the designator 812 associated with the first cell of the first packet in the queue and tail 811 pointing to the designator 815 associated with the first cell of the last packet of the receive queue (the descriptors each map to a 128-byte buffer in DRAMs 35 or 36). As shown, the queued packets are not necessarily complete, but in this packet-oriented implementation, data cells received from the MAC bus are "added" to the packet to which it is identified by Rcv Ckt Id in the burst header, rather than at the end of the queue.

In the receive operation, the QM Descriptor SRAM is organized into a buffer descriptor table and a receive context (or circuit) table. The buffer table or list has descriptors containing two 4-byte words, with word 0 containing a buffer address of a data buffer in the RAMBUS® DRAM (hence the buffer table entry is an implicit buffer), and word 1 containing a pointer to another descriptor in the buffer table. At initialization, the buffer table is a "free buffer table" the designator of the first free buffer to which the QM hardware by a head pointer points and the second word of which points to the next free buffer descriptor, and so reiterated in a link until the last free buffer designator which contains a null terminator in its second word.

As a data cell is presented by the MAC bus to the QM, the QM extracts its circuit id from its canonical or burst header and checks for an entry in the receive context (circuit) table which yields information on the activity of that circuit. When an SOP is detected, an entry on the receive context table (8 bytes/circuit) is created and a pointer (current buffer) is entered pointing to the next free buffer designator. The cell data is written into the associated RAMBUS® DRAM buffer. The free buffer list pointer is moved to the next free buffer designator after the "current buffer" is allocated.

If the received cell was not an SEP, the second word in the buffer designator points to the next free buffer designator, preallocating the associated buffer, and a "0" is written in the second word of that next buffer entry.

If the received cell was an SEP or an EOP, the second word in the buffer descriptor is set to point to the first buffer descriptor for the packet, and the resulting link-list defining the packet is de-linked from the receive context table. The cells received with the same circuit id, which may be interleaved on the MAC bus, are thus virtually reorganized by link-lists into packets, some of which may be incomplete even when leading cells are transmitted in cut-through operation. In the latter case, as shown in FIG. 30B, the current buffer of the receive context table 820 points to the next buffer descriptor 833 corresponding to the buffer into which the data cell is to be loaded, and the buffer descriptor 833 is linked to the descriptors 832, 822, and 821 of the other cells of the packet, one of which, descriptor 832, is linked as the current buffer 821 of a circuit entry in the transmit context table. Since the circuit entry in the transmit context table provides routing information, the data subsequently placed in the buffer associated with descriptor 833 "knows where to go." This system of link management allows "cut-through," that is, the transmission of portions of a packet while other portions are still being received.

6. Relay Engine Processing/Flow Matching (FastPath™)

Figure 19:
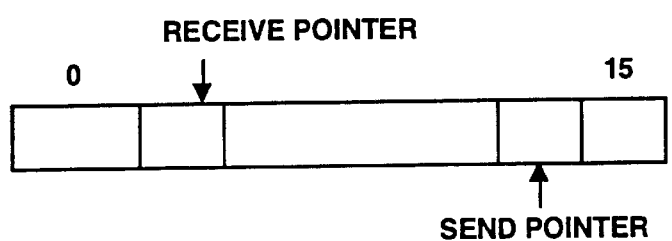
FIG. 19 shows a pointer-register structure used in the preferred embodiment of the invention.

The receive queue of linked descriptors of SOPs waits for processing by the RE 40. The SOP cells themselves are loaded, as room is made available, into a "circular" FIFO 394 of four 128-byte registers processed by the relay engine. Alternative embodiments of the invention may include more or fewer registers in the FIFO 394. This is implemented with a pointer system that follows the processing of the SOP cells, adding cells until the register is full (when the send pointer "catches up" to the receive pointer in FIG. 19), then adding another cell only when processing of the cell pointed to by a head pointer is complete and dropped (and the receive pointer "falls behind" the transmit pointer).

The RE operation centers around a four-stage pipeline. Pipelining is a term of art used for many years, especially in high speed hardware designs, and will not be further discussed herein except incidentally. The RE's task is to determine how to best forward a frame flow and to provide forwarding information accordingly to the QM to route and schedule retransmission of stored packets. The four stages are briefly described here, followed by a more detailed description of the hashing and signature functions used to perform pattern matching to identify a flow.

The first stage stores the full header information (the entire SOP cell) in a "circular" data FIFO, in parallel as the header is processed by a hash engine to compute a hash and a signature value to perform a pattern-matching function to check whether the packet is part of an existing flow for which routing and scheduling information has already been developed.

The second stage receives the Hash value which is used to address a Hash Table L1 391. If a valid entry is found in this table, the signature from the L1 Table is compared to the computed signature of the Hashed data. If consistent, then a Flow Tag (not shown) from the Hash Table is presented to the next stage of the pipelined FE/RE hardware design together with an indication that a valid hit was found. The Flow Tag is a 28-bit index into a table in memory where information about the flow is stored. In alternative embodiments of the invention, a smaller or larger index may be used. This information will include the circuit or circuits on which to forward the packet along with other flow related information as described elsewhere herein.

A valid Flow Tag pointer (linking the contents pointed to) is the preferred result of the pattern matching functions described in this preferred embodiment If a match is not found in L1, the search is performed on the off-chip L2 Table 45. Signatures are compared as above and the Flow Tag from the L2 table is presented to the next stage. To facilitate the next search, the L2 entry is written into the L1 table.

If there is no hit in either L1 or L2, the computed hash and signature are presented to the next stage with an indication that no hit was found.

The third stage receives the above information and determines if the header look-up was successful. If successful, the header data is updated according to the protocol rules that apply and the packet is forwarded according to the flow information. If, however, the header is found to be a TCP (Layer 4 Transport Control Protocol) SYN packet, or an equivalent start of connection packet in another protocol, or if the frame is not part of a known connection flow, the packet is not forwarded according to the flow information. In these instances the RE acts to route the frame by decoding the full pre-hashed header. In the process, it creates useful flow information and inserts a tag that points to it in the L2 Hash Table using the hash and signature values obtained by the hardware in stage one.

In the fourth stage of the pipeline, the header is passed back to the QM to be queued for transmitting on the specified queue according to the information supplied by the Flow Tag or the routing information supplied by the RE's decoding of the full pre-hashed header. For putting together the information to forward subsequent packets of the flow, the RE examines the application layer data in addition to the Layer 2 and Layer 3 headers.

In further detail, with reference to FIG. 4, when a packet is received, the QM 30 provides a useful header (as determined from the NL field) which may be as long as 128 bytes to the FE/RE by loading that header data onto a dual ported circular buffer in the RE. With reference to FIG. 4, the header data is sent from the QM 100 to the MUXIn 102 and placed on a FIFO stack DF in the RE 40. The RE uses the network link byte to index into a previously stored ordered data array of 128-bit entries, where each bit corresponds to one of the full received header data bytes. The bytes that correspond to the bits with a one are extracted and processed by the hash and signature functions. The byte string is padded at the end with zeroes to provide a string that is an even multiple of four bytes. In this preferred embodiment, up to 64 of the 128 header bytes can be processed by the hash/signature operation, but fewer or more can be used to advantage in other preferred embodiments.

The hash and the signature functions are identical except that different multipliers are used. But, in other preferred embodiment, other combinations of different multipliers and different divisors may be used to advantage.

With reference to FIG. 4, the Hash Preprocessor 399 inputs the selected bytes from the 128 bytes of the header data. The selected bytes form a number (n) of 32-bit words (multiples of 4 bytes, as noted above). The bits in this sequence of 32 bit words are treated as a polynomial in the Galois Field, GF[2] —a Galois Field of 2 (Galois Field is known in the art). In this preferred embodiment, the polynomial is multiplied by a random 32-bit polynomial, and then divided by a carefully chosen polynomial of order 32 resulting in a 32-bit remainder. The divisor used above is selected to be both irreducible and primitive (irreducible and primitive are terms known in the art). A subset of the remainder bits are used as the actual index into the hash table. Bits 5 down to 0 are addresses directed into the on-chip L1 cache 391. Bits 16 to 1 are used to address the 64K locations in the off-chip L2 RAM 45.

The divisor used in this preferred embodiment is $x^{32}+x^{7}+x^{5}+x^{3}+x^{2}+x+1$, although others may be used provided they are both irreducible and primitive.

Figure 20A:
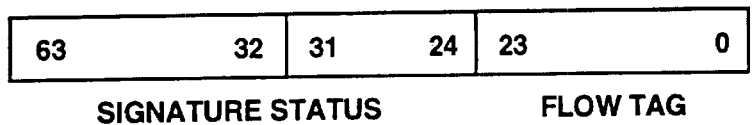
FIG. 20A shows the data structure of a hash table entry used in the preferred embodiment of the invention.
Figure 20B:
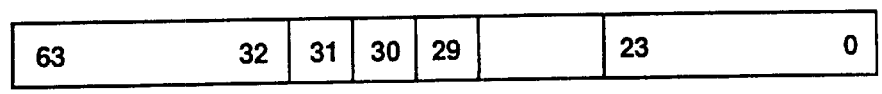
FIG. 20B shows the data structure of another hash table entry used in the preferred embodiment of the invention.

The contents of the Hash Tables which identify the Flow Tag and/or the destination of the incoming frame are organized as follows:

Hash Table 1 contains 64 words each of 64 bits, and it exists on chip to optimize the return of the value in the common occurrence where only a small number of flows are active. Larger tables can be used. In the present embodiment of the invention, in each word, see FIGS. 20A and 20B, bits 31–28 form a status where bit 31 being true indicates a valid entry. Bits 0–27 (* as opposed to Bits 0–17 ??? *) form a 28-bit Flow Tag where information about the particular flow is stored. The tag is a pointer to information about the circuit or circuits to which the packet will be forwarded. Obtaining the Flow Tag is the primary task of the RE. The Hash table also contains the 32-bit signature at bits 63–32, which is used to ensure that no collision has occurred and the result is valid. In order to further ensure the validity of the Flow Tag look up, the pre-hashed header data is stored so that unambiguous identification may be performed.

If there is no match in the L1 Hash table, the system will use the hashed result bits 16–0 to index into the 64k Hash Table L2. Each location will have a 64 bit width. Bit 30 is a Hash Bucket pointer wherein, if this bit is a zero, the bits in L2 table are organized functionally as in the L1 table. If there is one valid entry at this Hash Address, the system takes L2 bits 0–23 to be an index into a flow table to obtain a flow tag. See FIG. 20B. If there are no valid entries at this Hash Address, L2 bit 31, the Valid Bit, is set to a zero. If there are two or more entries at this hash address, then status word bit 30 is set to a one and the system takes the L2 bits 55–36 as a pointer to the Hash Bucket.

The Hash Bucket holds up to eight aliased addresses of 64-bit words. If the collision bit 29 is a one, an aliased condition persists for both the hash and the signature operations and no further resolution will be performed by the hash mechanism, as no useful information can be obtained. At this point the two conflicting flows are handed back to the processor to perform a Trie search for routing information. The eight words in the Hash Bucket are searched sequentially, and to facilitate this search the addresses are sequential starting at the lowest index into the table. If more than eight entries are directed to the Hash Bucket, the system reverts and the overflow are searched via the Trie routine. The Trie search uses a co-processor 390 and is organized as a large Trie database for routing and bridging.

The occurrence of signature and/or hash collisions can be monitored, and if excessive, the respective multipliers can be changed. Such changing results in a better randomization for the given set of addresses encountered in the network.

The hashing and signature routine results are not used in certain circumstances: when a connection is initiated, as when a TCP SYN or an equivalent "start of connection" packet arrives, or when a packet is found that does not belong to a connection flow, or the packet is part of a high security or other special mode. When such conditions are found the system can revert to the Trie search.

Generally processing of subsequent packets in a flow is accelerated by the optimization of software pattern matching as described above The RE returns information with instructions indicating which queue the cells are to be placed for forwarding along with the addressing. The QM receives the information and places the cells, which are stored in linked lists forming the contents of the packet which is being or was received, on a list to be transmitted.

7. Transmission Scheduling

The RE programs the QM, developing virtually by linked pointers in the QM Descriptor SRAM up to 16,000,000 transmit queues (24 bits) with managed priority for the various circuits.

Figure 35:
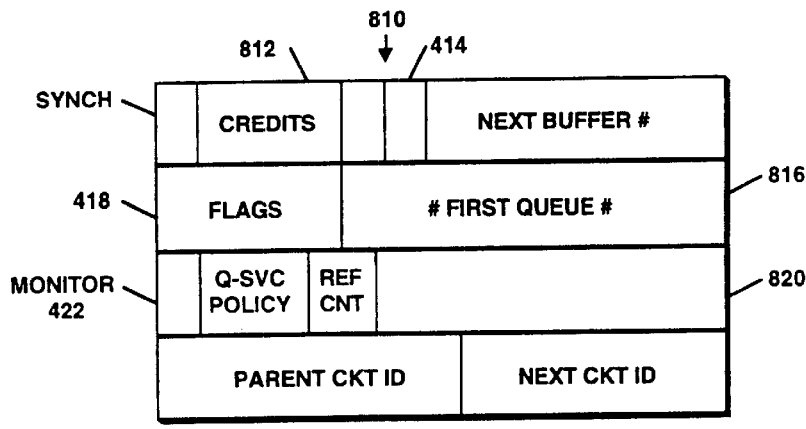
FIG. 35 shows the data structure of a transmit context table entry used in a preferred embodiment of the invention.
Figure 35A:
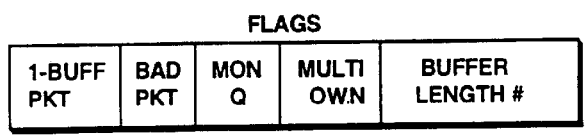
FIG. 35A shows the data structure of a field of the data structure shown in FIG. 35.
Figure 35B:
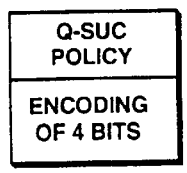
FIG. 35B shows the possible service policies encoded in the Q SVC Policy field of the data structure shown in FIG. 35.

The core of the transmission phase is the Transmit Context Table, which is organized by circuit, four four-byte words for each circuit as shown in FIG. 35. Word 0 contains a credit sync bit, seven bits 812 for transmit credits (no transmission unless a credit exists for the circuit), a start of packet bit 814, and 23 bits designating the next buffer to transmit (next buffer ID). Word 1 816 contains eight flag bits 818. FIG. 35A shows the meaning of these flag bits: Bit 7 indicates that the packet is a single buffer; bit 6 indicates that the packet is bad, usually from a CRC error, and that the MOM should abort this packet; bit 5 indicates that the packet was dequeued from the monitor queue wherein the packet can be off loaded at some other port or to the background engine for traffic analysis; bit 4 indicates that the packet is "multi-owned" or may be transmitted to more than one circuit; bits 3-0 indicate the buffer length in bytes up to 128 bytes in groups of sixteen bytes. The remaining 24 bits of Word 1 contain the address of the first queue (each circuit may have 1, 2, 4, 8, or 16 associated queues) Word 2 820 in the transmit context table contains one bit 822 that indicates that a monitor queue is attached, four bits that indicate the queue service policy, and three bits that indicate a reference count. FIG. 35B shows the meanings of the four queue service policy bits. The possible designations are: one queue; two, four, eight or sixteen static queues; two, four, or eight weighted round robin queues; or two, four, eight and sixteen one-half static and one-half weighted round robin queues. As described below, the static queues have the highest priority, followed by the weighted round robin queues. Word 3 contains the stand-by scheduler control word, which consists of "next cct Id," "parent cct Id" (used only for stand-by scheduler circuits), a state bit (active or idle) and a stand-by scheduler interval.

Figure 36:
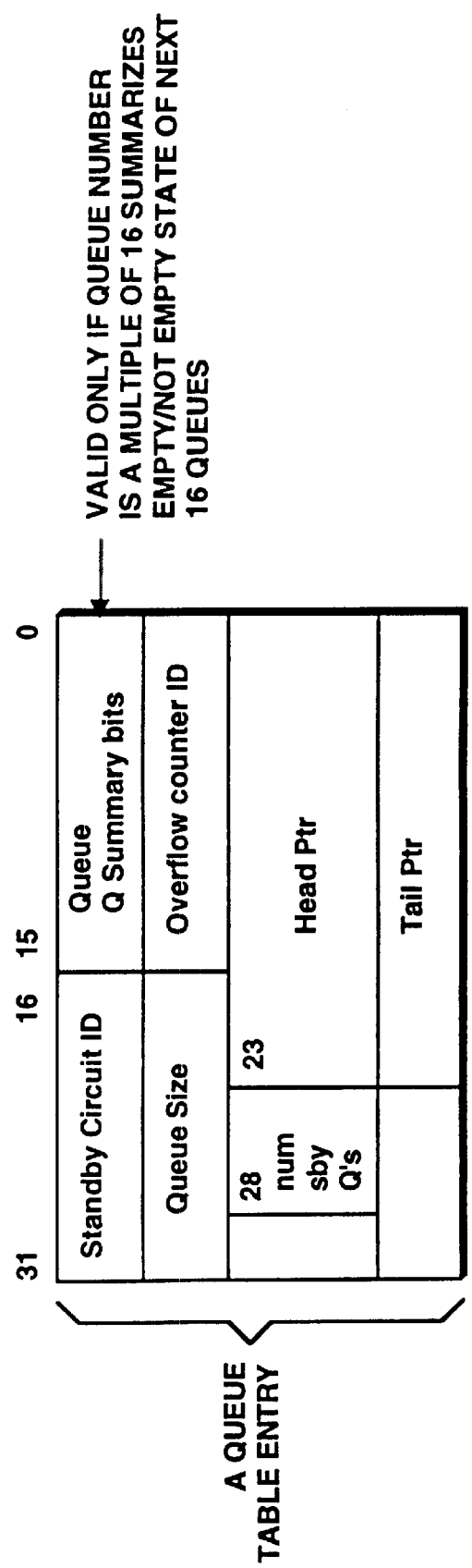
FIG. 36 shows the data structure of the queue table used in the preferred embodiment.

The Queue Table shown at FIG. 36, which coordinates with the Transmit Context Table, contains four four-byte words for each queue. Word 0 contains a 2-byte standby circuit ID (discussed below) and two bytes of queue summary bits (only in every sixteenth queue number). Word 1 contains two bytes indicating the queue size and a 2-byte overflow counter ID. Word 2 contains a five-bit field indicating the number of standby queues and 24 bits for the head-of-queue pointer. Word 3 contains a 24-bit tail-of-queue pointer.

In the preferred embodiment, it should be remembered that a queue is formed by linking the SOP cells starting with a head-of-queue pointer to the first SOP (and a tail pointer to the last SOP), and new cells of a packet are added to the cell of the packet. Thus, referring to FIG. 37, there are four SOPs in queue 16 of Queue Table 850, represented by linked descriptors 863, and two SOPs or "packets" in queue 17 represented by linked descriptors 864. Incomplete packets, such as that represented by linked descriptors 862 may nonetheless be transmitted (allowing "cut-through"), but transmission will stop on the circuit when the last descriptor indicates that its associated buffer is empty, thereby preserving the rule that packet order is preserved on a circuit.

The queue policy allows prioritizing and scheduling of transmission of data packets. Thus, under a fixed static priority, all the packets on a particular queue are transmitted before those on another. In a weighted round robin scheme, a certain number of packets on one queue are transmitted, then a certain number of packets on the next queue are transmitted, and so forth, this allows classes (queues) of traffic to have relative priorities without "starving" the lower priority classes. A "half-and-half" scheme is provided in which the static queues have priority, and when they are served.

Figure 37:
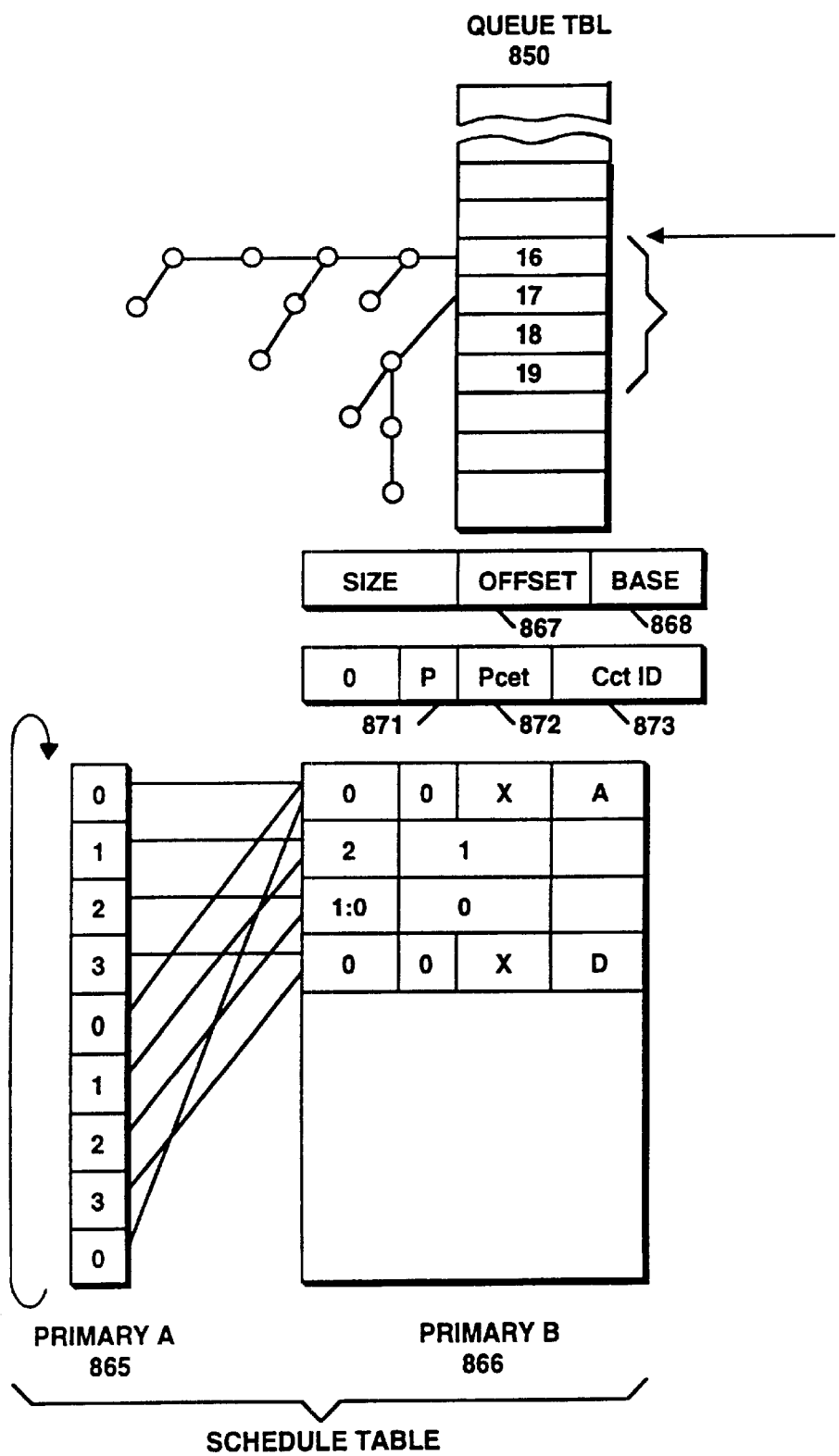
FIG. 37 represents possible links and queues in the transmission phase of the preferred embodiment.
Figure 37A:
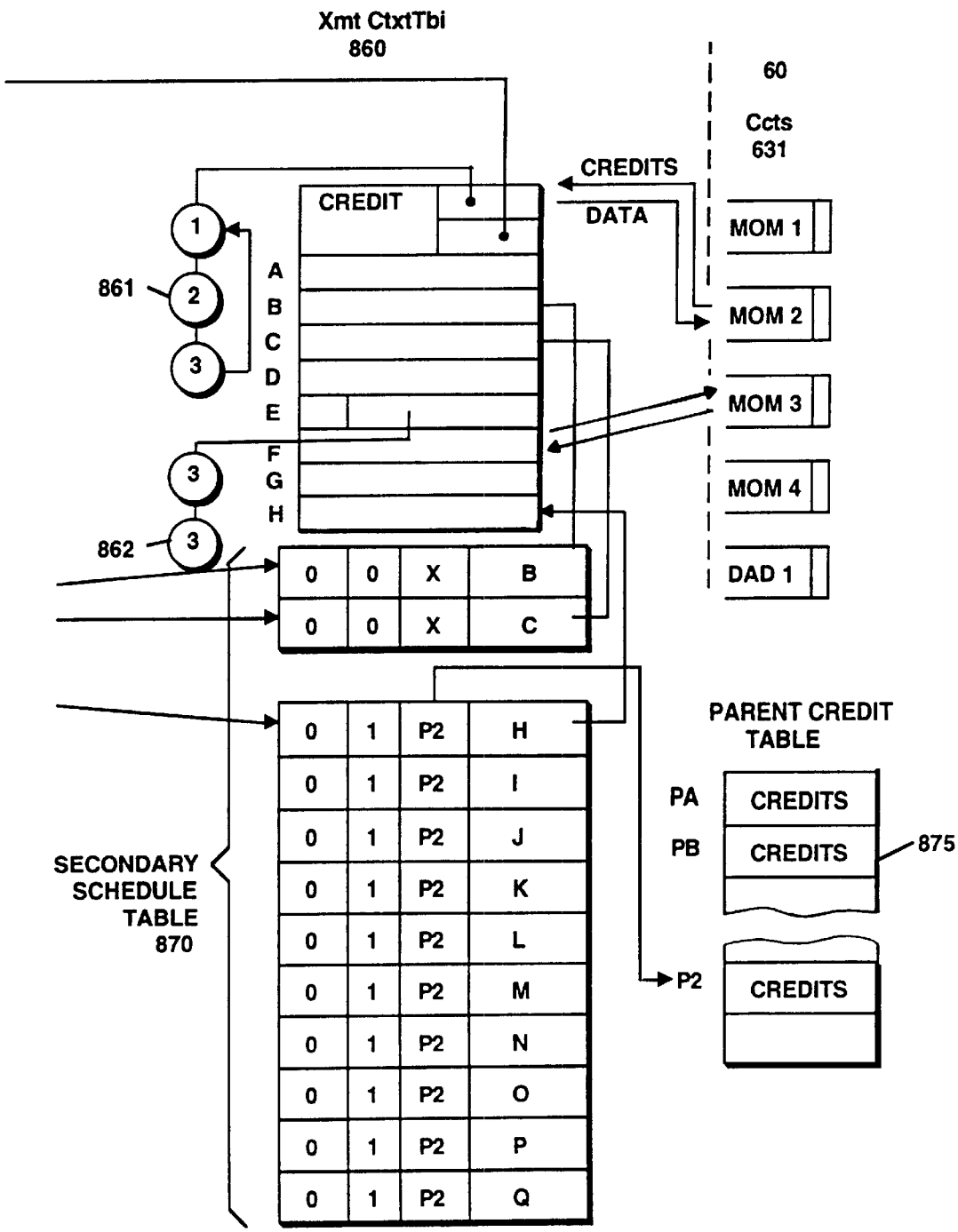

A Schedule Table for the circuits in use is scanned continuously. As shown in FIG. 37, this is composed of a Primary Schedule Table with a Primary Schedule Table A 865 and a Primary Schedule Table B 866 and a Secondary Schedule Table 870. The Primary Schedule Table is located on-chip and consists of the two mentioned subtables, each with 64 entries. Slots in Primary Schedule Table A are visited once every Schedule Table time "tick." A Primary Table A entry contains a 6-bit index to an entry in Primary Schedule Table B. As shown in FIG. 37, any given Table B entry may have more than one Table A entry pointing to it. Primary Table B entries contain the size of the secondary table, and if the size is not equal to "0", then it also contains an offset into the secondary table 867 and the base address of the secondary table 868. If the size is equal to "0", the remaining fields are the "Use Parent Circuit" bit 871, the Parent Circuit ID 872 and the Circuit ID 873.

A cell transmission event is triggered when a schedule table entry with a Circuit ID is found. By entering the appropriate Circuit Ids in the Schedule Table, a cell transmission ordering pattern is created which effectively allocates bandwidth to circuits according to their respective proportion of transmission events.

The hierarchical nature of the Schedule Table allows a wide range of rates to be programmed. This is done by "chaining" up to 3 levels of subtables. If the size field of a Primary Table B entry is not zero, this entry contains a pointer to a Secondary Table which is located off-chip. A Secondary Table 870 may have up to 255 entries, each of which may point to a Tertiary Table or may contain a Circuit ID. When table chaining is encountered, the offset field 867 is used to keep track of which entry is to be accessed in the lower-level table. At each visitation, the offset is incremented, modulo the table size.

The Stand-by Scheduler (SBS) is a secondary scheduling mechanism. As its name implies, it schedules traffic for bandwidth left over from the Schedule Table. There are 2 cases where stand-by traffic can be transmitted: (1) a transmit event resulted in no data sent for a circuit (lack of credits or lack of data); and (2) the Circuit ID programmed in the Schedule Table is zero, thereby pre-allocating a certain amount of bandwidth to stand-by traffic.

The SBS uses a version of the Calendar Queue algorithm, essentially a slotted time ring implemented as an array of linked lists. Each element of the array corresponds to a different time slot. Attached to each time slot is a list of circuits which are scheduled to send a cell at this time. A slot index advances with time. When a populated slot is found, a cell for the circuit at the head of the list at that slot can be transmitted. When a cell is transmitted for a particular circuit, the eligibility time for the next cell on that circuit is calculated and mapped to another time slot.

Figure 38:
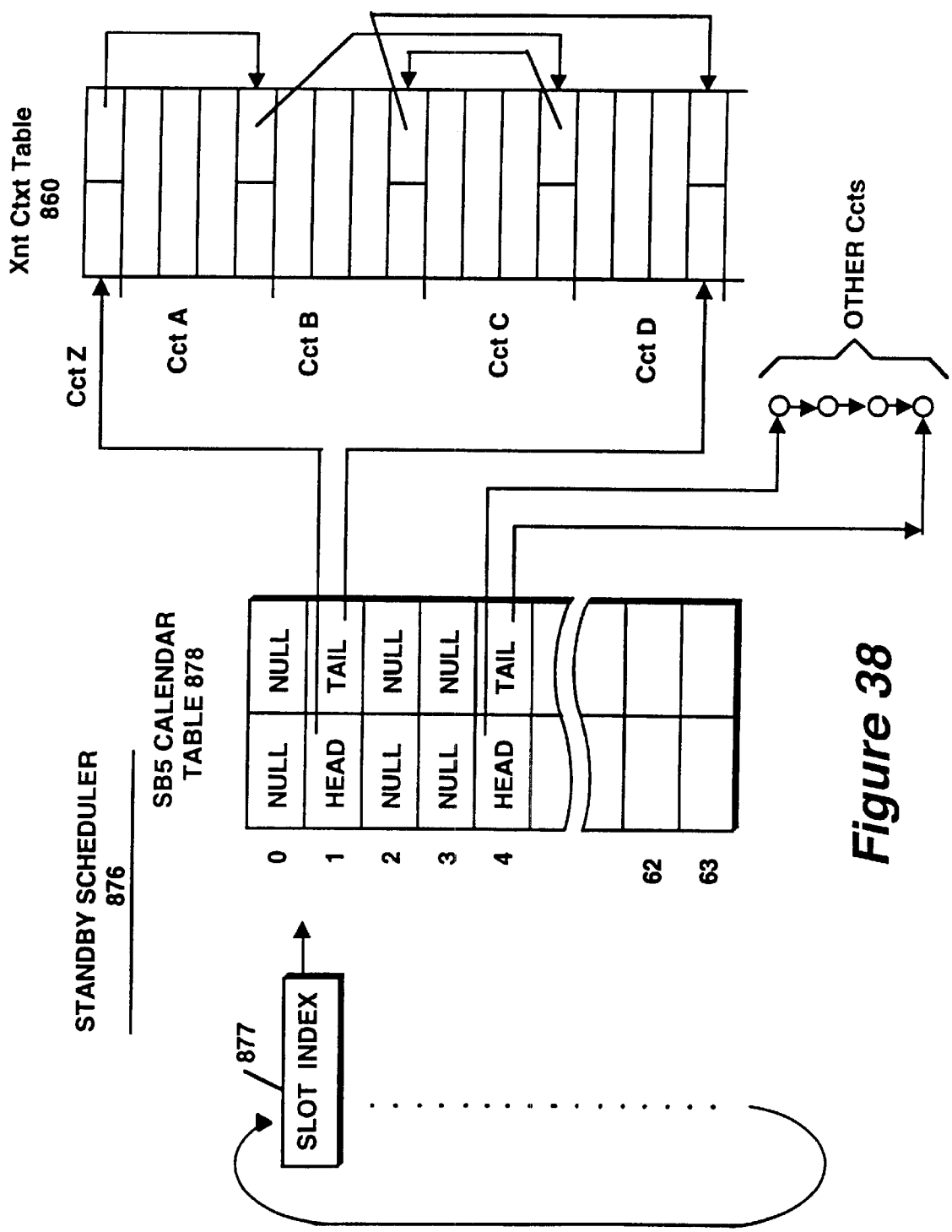
FIG. 38 shows the operation of the standby scheduler used in a preferred embodiment of the invention.

Referring to FIG. 38, the Stand By Scheduler Calendar Table 878 is an on-chip table consisting of 64 entries. Each entry contains a head and tail index to describe a linked list of circuits attached to a particular slot. The links are stored in the Next CCtId field of word 3 in the Transmit Context Table 860. The slot index 877 advances with periods corresponding to the QM core clock. When a SBS opportunity arises, the next circuit to transmit is found by scanning forward from the point in time represented by the current value of the slot index. The next circuit to send is the one at the head of the list for the next populated slot. Once the next circuit is found, it is dequeued from the list and rescheduled.

Rescheduling is performed by calculating the next slot at which the circuit should be sent. The calculation of the next slot is based on the SBS Interval field of Word 3 in the Transmit Context Table. This field is a 6-bit number representing the number of Calendar Table slots between successive transmission events for the circuit. The next slot for a circuit is the current slot plus this interval, modulo the table size. The net effect of the SBS is an approximation of the Weighted Fair Queueing algorithm. The weight of a given circuit is the inverse of its SBS Interval.

Another aspect of the Stand-by Scheduler is its ability to perform dynamic bandwidth allocation based on only the circuits which are "active," i.e., have data to send. Thousands of circuits may be enabled for stand-by bandwidth. Only a small number, however, will likely be active at any one time. In order to more efficiently use stand-by bandwidth, the SBS keeps only active circuits in the scheduler. It receives messages from the process managing the Queue Table when a circuit becomes active or goes idle. The transition from active to idle occurs when a packet is dequeued resulting in all queues for the circuit becoming empty. The transition from idle to active occurs when a packet is enqueued to a circuit which has all empty queues.

Any circuit may be scheduled using both the Schedule Table and the SBS simultaneously. This is useful for ATM Available Bit Rate ("ABR")traffic.

The "sending" in the preferred embodiment starts with the delinking of a packet string (which may be incomplete) from its queue ("dequeueing") and its linking to the current buffer of the Transmit Context Table 860 (as shown in FIG. 37). The circuit entries of the Transmit Context Table are then polled to send the buffer contents of the current buffer (if not empty) to the corresponding "circuit" 63'. Cell data is read from the RAMBUS® DRAMs according to the "ping-pong" scheme described below.

Figure 39B:
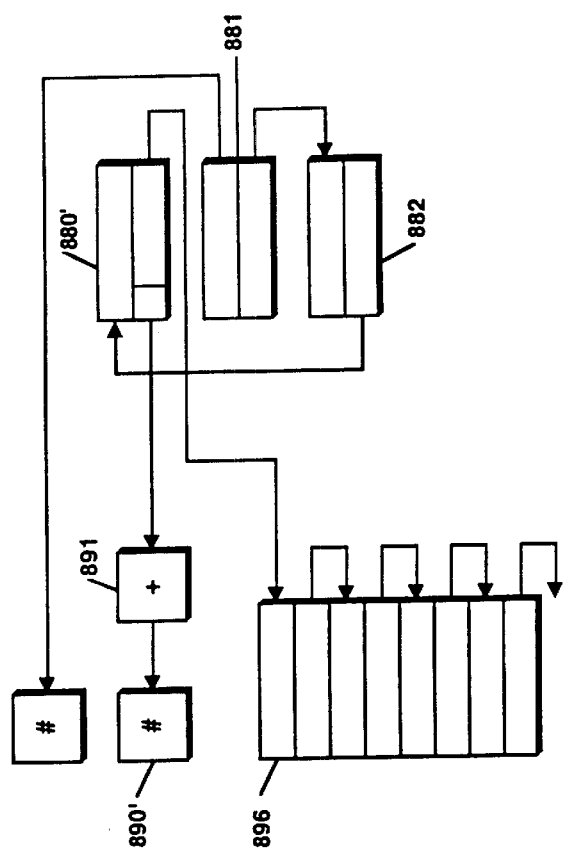
FIG. 39B represents the delinking of the descriptor set shown in FIG. 39A to free the buffers described by the linked descriptor set shown in FIG. 39A.
Figure 39A:
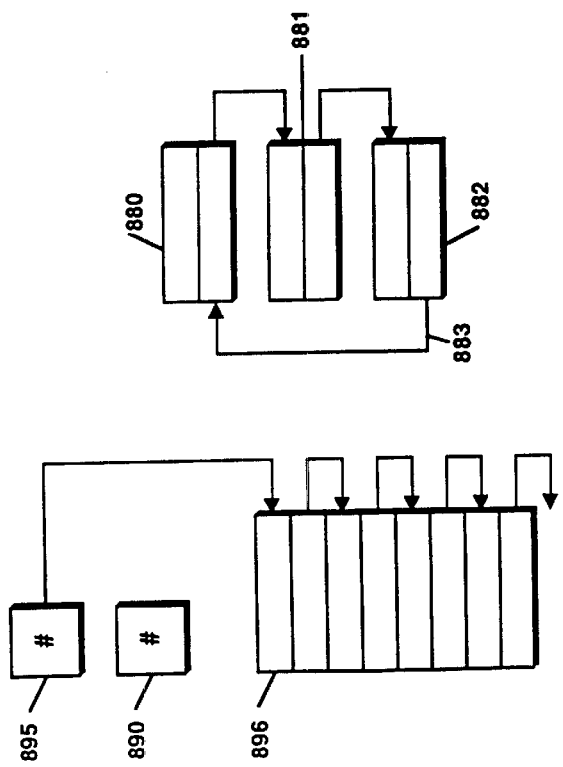
FIG. 39A represents a linked descriptor set representing a complete packet in memory in the preferred embodiment.

When a packet is fully transmitted, its buffers are returned to the free buffer list. Completion of transmission of a packet is indicated when the next buffer of the transmit context table is directed to the descriptor 880 associated with the first buffer of the packet by the second word of the descriptor 882 of the last buffer of the packet, referring to pointer 883 in FIG. 39A. The free buffer manager (not shown) then checks whether there are other "owners" (such as for multicasting) by looking at the "owners field of descriptor 880 of the SOP, and if none (if value is one, otherwise decrement), as shown in FIG. 39B, it increments the free counter 890 by the buffer count 891 in the second word of descriptor 890. It moves the free buffer list head pointer 895 from the head of the free buffer list 896 to the descriptor to which descriptor 880 points, namely descriptor 881 of the buffer of the second cell, and enters in the next descriptor field of descriptor 880 a pointer to the previous head of the free buffer list 896. As seen in FIG. 39B, all three buffers are thus linked at the head of the free buffer list.

8. Transmission Credit Loops

Figure 31:
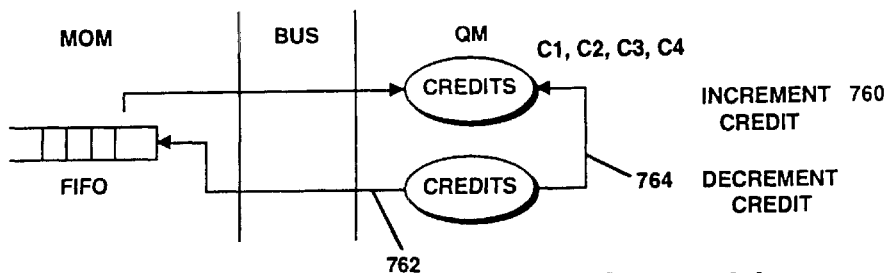
FIG. 31 is a representation of a credit-managed transmission system used in the preferred embodiment of the invention.

In the preferred embodiment, a hierarchical flow and congestion control scheme is provided by the use of multiple credit loops. A system of credits is established that indicates the ability of the MOM chip, for each of the eight output channels, to accept cells for transmission. As the MOM, for a particular channel is sending a packet, cell by cell, and as each cell is sent the MOM indicates, through the credit bits described above, that another cell can be transferred to the MOM chip. As shown in FIG. 31, the MOM, upon sending out a cell will increment the credit count 760, and as the QM transfers cells 762 to the MOM, the QM decrements the credit count 764. As noted above, the credits have a circuit ID such that the proper MOM channel credit is retained. In this preferred embodiment, as many as four transmit cells can be stored. The MOM has a FIFO in which the packet is reassembled from the cells.

Figure 32:
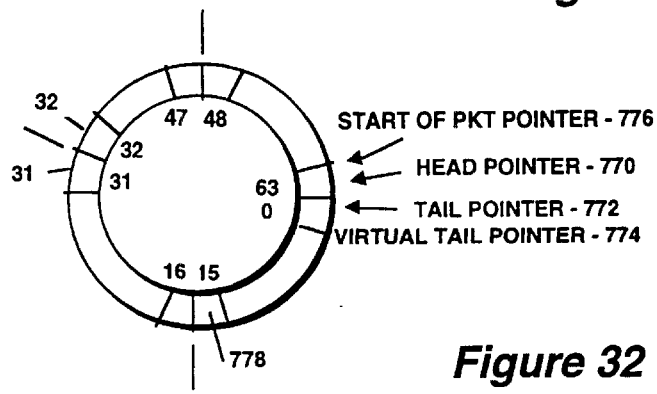
FIG. 32 is a representation of a ring-pointer system used in the preferred embodiment of the invention to determine whether credits should be issued in the system represented in FIG. 31.

When a cell is transmitted by the MOM chip, the credit sent back to the QM is a credit for a maximum length cell, which may be 17 octbytes when in cell mode or 16 octbytes when in packet mode (because the MOM deletes the burst header when in packet mode). The QM, however, may send down something less than the maximum cell size. FIG. 32, which is duplicated for each output channel associated with the MOM chips, diagrammatically shows the mechanism by which the credits are processed in the MOM chip. There is a head pointer 770, a tail pointer 772, a virtual tail pointer 774, and a start of packet pointer 776. In this preferred embodiment there are 512, or four full 128 -byte location in the transmit FIFO. In FIG. 32, there are 64 slots, each slot 778 representatively holding one octbyte. (The 64 octbytes equal the 512-byte storage capacity of the FIFO in this embodiment.)

At initialization the FIFO is empty, and the virtual tail is incremented, moving it through the FIFO locations. The virtual tail pointer stops when it reaches or attempts to reach the head pointer. Each time the virtual tail pointer increments, a single credit is sent via the transmit and receive credit managers in the MOM chip. These credits are accumulated in the QM for this circuit. As the MOM receives cells to this circuit, the tail pointer (this pointer points to real information representing actual cell lengths) is incremented. If the QM sends less than a full cell, the virtual tail pointer is corrected. When the MOM actually transmits the cells the head pointer is incremented. As the MOM sends out the cells the head pointer moves away from the virtual and the real tail pointers, opening up room in the FIFO. When the virtual tail pointer, which might have been corrected by the QM sending less than maximum cells, can increment a maximum cell length in the transmit FIFO, without wrapping the head pointer, a credit is sent and established in the QM.

The other remaining pointer, the start of packet pointer 776, has one important function. That function is to retain the starting location of the start of the packet, so that if there is a collision on an Ethernet cable, the packet that was collided with can be retransmitted, in accordance with the published specification.

With regard to FIG. 2, the virtual tail pointers are controlled by the transmit credit manager and the real tail pointers are controlled by the transmit FIFO "producer," and the "consumer" controls the header and the start of packet pointers. All the pointers are accessible to all the transmit credit manager for comparison and for issuing credits.

Figure 33:
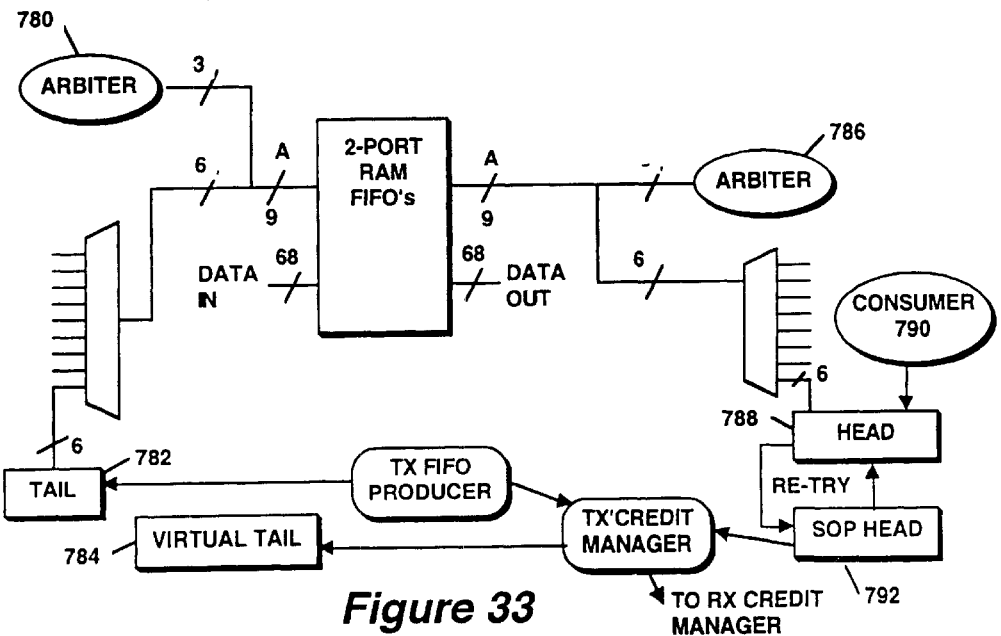
FIG. 33 is a more detailed representation of the system represented in FIG. 31.

FIG. 33 indicates how the MOM FIFO, a two-port, 64-octbyte memory, is controlled. An arbiter 780 controls the most significant three address bits of the FIFO from the "producer" side to keep track of the cells loaded from the QM, and the lower six bits, the total of nine bits needed to address the 512 locations, are controlled by the tail pointer 782 (one shown of eight). The virtual tail pointer 784 does not point to real data; it is a counter mechanism by which the credit manager can determine the number of credits to send to the QM. Another arbiter 786 and head pointers (one shown of eight) control the unloading and freeing up of the FIFO as packets are physically sent out by the MOM chip. The head pointer 788 controls the lower six bits of the FIFO from the unloading side of the FIFO. The consumer increments the head pointer as the data is sent out. The head, tail and start of header pointers are available to the transmit credit circuitry.

Referring to FIG. 26, a portion 742 of the first octbyte of the initial canonical header and, referring to FIG. 27, the burst header contain two credit flags, the "synch" flag and the "parent" flag. The synch flag is used at power up to properly establish the credit cycle operation described above. At power up, the MOM sends synch flags to the QM about every 10 milliseconds. When the QM has powered up, the QM looks for the synch flag, and when found the QM sends a synch acknowledge to the MOM. The MOM then will send up any credits as described above with the assurance that the QM is ready to accept the credits.

Figure 34:
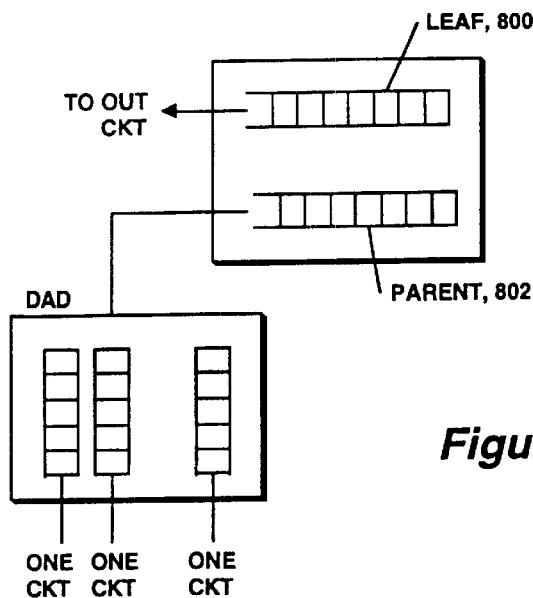
FIG. 34 is a representation of a hierarchical queue system used in a preferred embodiment of the invention.

The parent flag is necessary because there can be a multiple of physical communication paths multiplexed into one channel of a MOM chip. When there is only one communication circuit connected to a MOM channel, as when the MOM is connected to an Ethernet, the credit system works as described above, but with many separate paths into one MOM channel, a method of maintaining credits for each of the paths connected to the one MOM channel was designed. One important aspect of this credit system is that it was necessary to ensure that none of the several communications paths connected to the one MOM channel could be blocked or locked out by another of the communication paths. In this embodiment, FIG. 34 shows two FIFO channels in a MOM chip. FIFO 800 operates with a single communications path. In this case, the MOM FIFO 800 is termed a leaf to indicate its operation with a single communications circuit. But FIFO 802 is associated with a FIFO channel that is connected to another chip, for example, a DAD chip 804 in this preferred embodiment, where the DAD is further connected to eight other communication circuits 804. In this case the FIFO 802 is termed a "parent" and the eight communications circuits connected to the DAD are the leaves. In this circumstance the QM maintains a credit for the individual leaves attached to the parent FIFO in the MOM. In this way the QM knows when the transmit FIFOs are filled and can accept no further cells. The QM can subsequently transfer cells to the other leaf by simply polling the credits in the parent and the leaves and transmit cells accordingly. In this manner one leaf cannot prevent the servicing of the other leaves.

Referring to FIG. 38, in the Schedule Table 866 in the QM, there is an indication 871 whether there is a parent associated with that particular circuit. The MOM, acting as a parent, sends up credits for the parent FIFO and for each of the leaves associated with that parent.

The Parent Credit Table 875 is a 64-entry on-chip table in the QM. Each entry contains a credit count for what is treated as a "parent circuit." When a circuit is bound to a parent circuit, it can only transmit cells onto the MAC bus if it has credits available in both its Transmit Context Table credit field and in its parents credit field in the Parent Credit Table.

When a cell is transmitted for a circuit with a parent, both the Transmit Context Table credits and the associated parent credits are decremented. Parent credit update cells from the parent channels are sent back to the QM which causes the parent credits to be incremented.

The Schedule Table is used to bind a circuit to a given parent circuit. The Use Parent Circuit Bit (P) 871 and the Parent Circuit ID field 872 are used for this purpose. If the schedule table entry has the P bit set, this means that this circuit has a parent and should use the Parent Circuit ID 872 to index the Parent Credit Table 875.

9. Ultra-High Speed Access on RAMBUS®

RAMBUS® DRAMs 35 and 36 are off-the-shelf items. In the present invention they are used in a unique manner that maximizes the reading and writing bandwidth of the RAMBUS® for this data communication application.

The invention provides an interface 308 to the RAMBUS® which utilizes the dual bank organization of a RAMBUS® to increase the useful bandwidth of the RAMBUS® memory. Dual FIFO stacks are used with a controller to alternately address the separate DRAM banks within the RAMBUS®. The FIFOs increase the latency and increase the hardware overhead of the RAMBUS® controlling electronics, but attempts to guarantee that the sequential data written or read comes from the alternate banks. In this manner, one bank is precharging while the other is being accessed, and then the other bank is precharging while the first bank is accessed.

Figure 40:
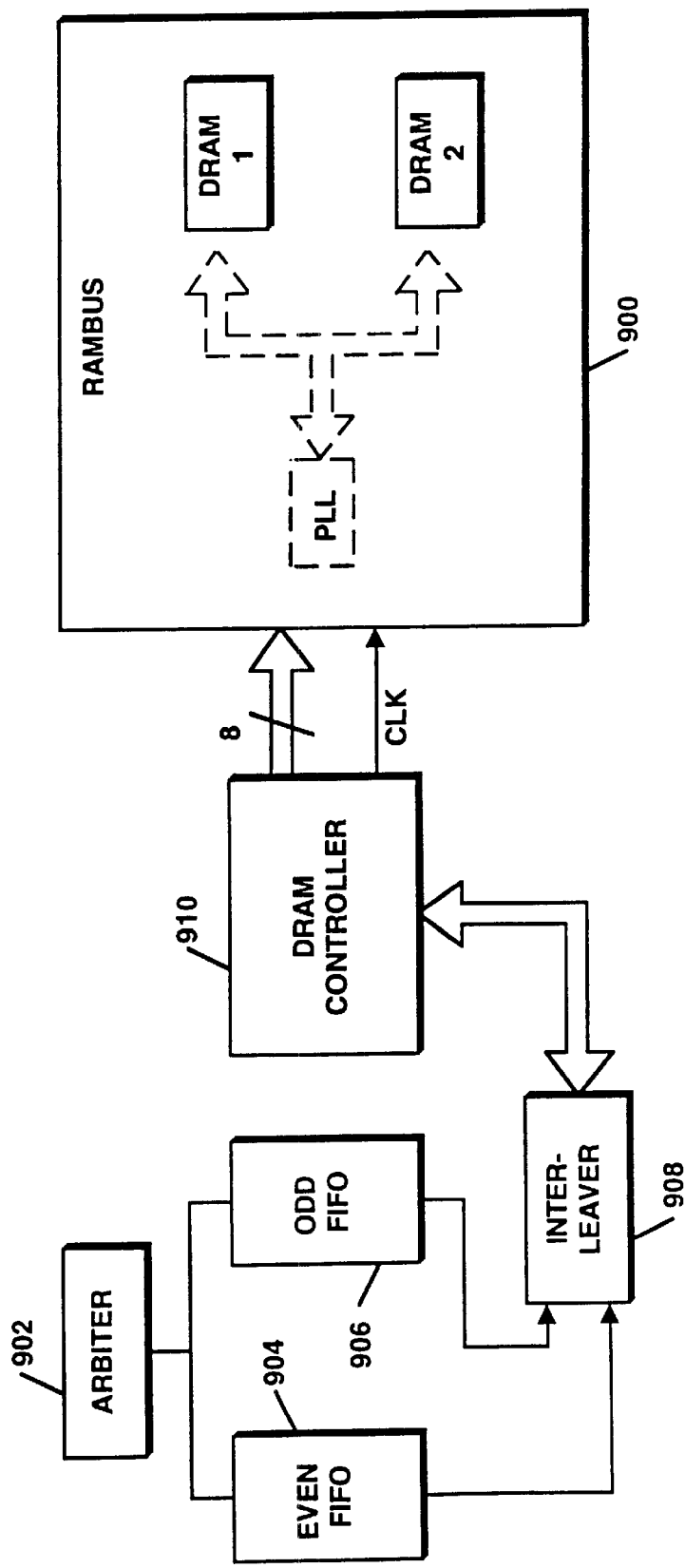
FIG. 40 is a block diagram of a DRAM control system used in the preferred embodiment of the invention.

Referring to FIG. 40, a RAMBUS® 900, is shown in block form showing the phase-locked loop, PLL, and the two dynamic RAM banks DRAM 1 and 2 (36, 37 respectively). The multiplexed data/address bus into and out of the RAMBUS® is essentially an eight-bit wide serial port with an accompanying clock.

The organization of data buffers in DRAMs 35 and 36 is such that all even data buffers (of 128 bytes) are on one bank and all odd data buffers are on the other. The arbiter 902 determines the order in which various requests for data are loaded onto FIFO stacks 904 and 906. The buffer addresses in the requests are either even or odd, and the requests with even buffers are loaded into FIFO 904 and the odd buffers into FIFO 906.

In the condition that the FIFOs are empty, the requests are loaded into the even or odd FIFO and the interleaver 908 transfers the request to the controller 910. As the requests become numerous, however, the requests in the FIFOs back up. When the requests have backed up into both FIFOs, the interleaver 908 takes the requests alternately from one FIFO and then the other ("ping-ponging"). Since these buffer addresses are alternately even and then odd, the controller accesses the two different banks in the RAMBUS® in an alternate or interleaved manner. In this operation, the first bank is being accessed while the second bank is being precharged, and, on the next access, the second bank will be accessed while the first bank is being precharged.

This alternative accessing substantially provides the fastest accessing for either writing or reading of the RAMBUS® and maximizes the throughput of the RAMBUS® memory as long as there are requests in both FIFO stacks, which is likely in high traffic situations. In contrast, requests presented on a purely FIFO basis likely will have a fractional number with back-to-back even or back-to-back odd requests causing a fractional number of time-outs to allow precharging.

Any latency relative to a particular request may in any case have occurred under normal access methods. The method here assures maximum usage of RAMBUS® resources under high traffic conditions.

10. Background Engine/Initialization

An important part of the invention is the use of the BE, interfaced on a MOM port during operation to perform monitoring and other higher-layer decision making. This allows for the BlazeWatch™ and Learn-and-Lock security systems to access configuration and control functions, among other applications.

With reference to FIG. 1, a Boot FLASH ROM 51 is provided that is accessible to BE 50 for initialization and start up of the system. The boot ROM instructions will run when there is a power up or a complete system reset. The boot will test and verify that the section of the BE DRAM 53 is operational and reliable. This section is where the ISB code and the BlazeNet Runtime Kernel (BeRT) will reside. The first 1F(hex) or 32 (decimal) addresses of ROM 51 hold the initial interrupt vectors. Addresses 20-7F hold ROM information; 80-FF hold console support interface Routines, 100-4FF hold a MOM attribute table; 500-1FFFB hold the boot image; and 1FFFC-1FFFF hold the boot image checksum of a cyclical redundancy check (CRC). In this embodiment, the remaining BE DRAM 53 will be tested in parallel with running the BeRT initialization process.

The boot also tests the interrupt structure and operation to insure that the BARK (the background engine kernel) can receive interrupts, for example, from timers. Next the boot will initialize the I2C bus 62 and assign addresses to the chips attached to the I2C bus. The boot then determines the ID of chips on the bus, including revision level. The boot then looks up the ID of the chips found, and an initializer is found in the boot directory which is downloaded and executed.

The main system image is in the NonVolatile Storage 52 in a compact flash card containing, for example 10 Mbytes of system software. Basic information is transferred on the I2C bus to the RE 40 and MOMs 10 and 20. The complete image is subsequently transferred on the DMA channel 64.

The above discussion describes the preferred embodiment of the invention(s) at the time of filing. It should be clear that equivalent components and functions may be substituted without departing from the substance of the invention(s). Various mixes of hardware and software implementation are possible while retaining the benefits of the invention(s). Because the invention is intended to be highly flexible and scalable, it is the cooperation of the modules here disclosed that is important, rather than the number of modules and ports.

11. Scheduling for Bulk Transfer

Certain applications move bulk data across the network, for example, e-mail with attachment, file transfer, and backup applications. Packets from bulk data transfer applications could congest an outgoing circuit (link). A graduated priority quality of service is here presented that addresses the congestion problem caused by bulk data transfers.

Figure 41:
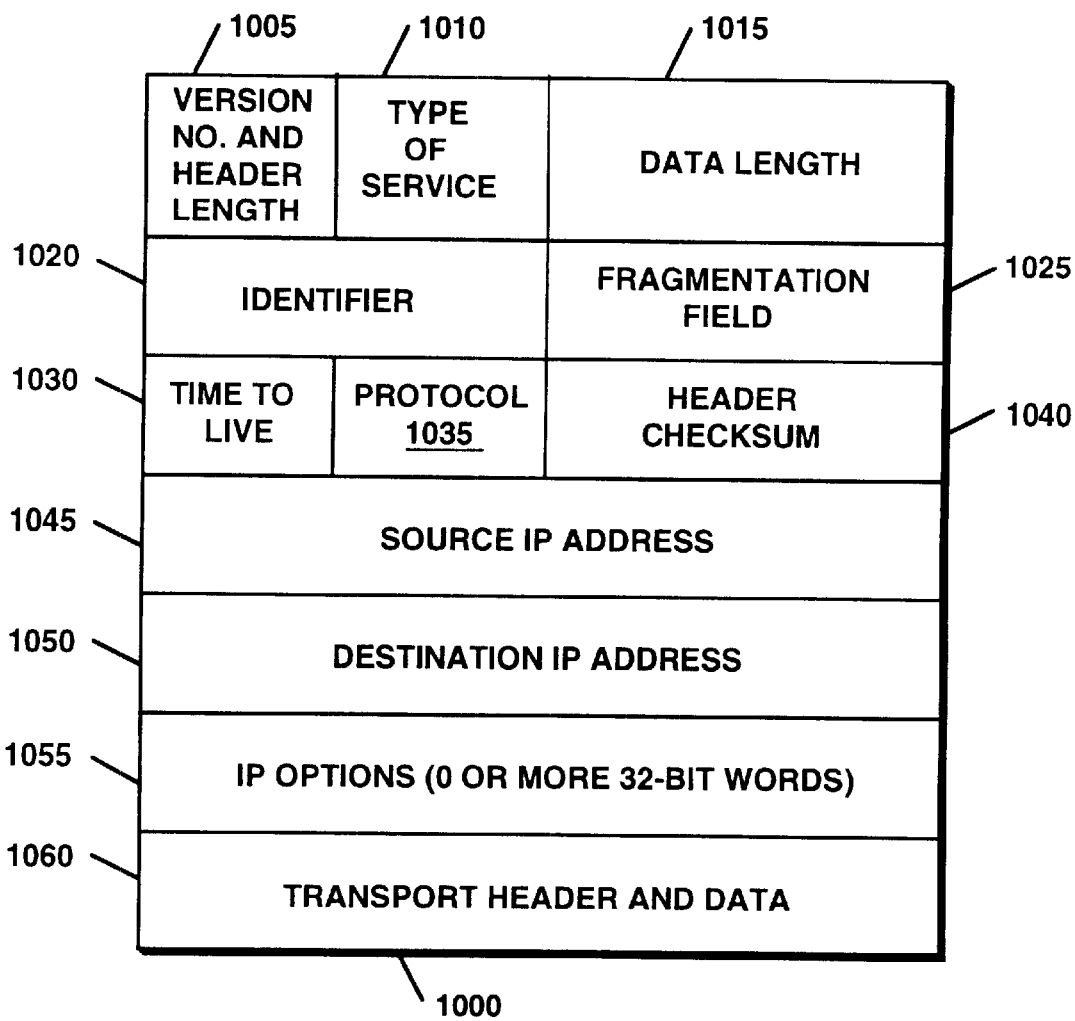
FIG. 41 is a diagram of a TCP (Transmission Control Protocol) packet typical of bulk data transactions.
Figure 42:
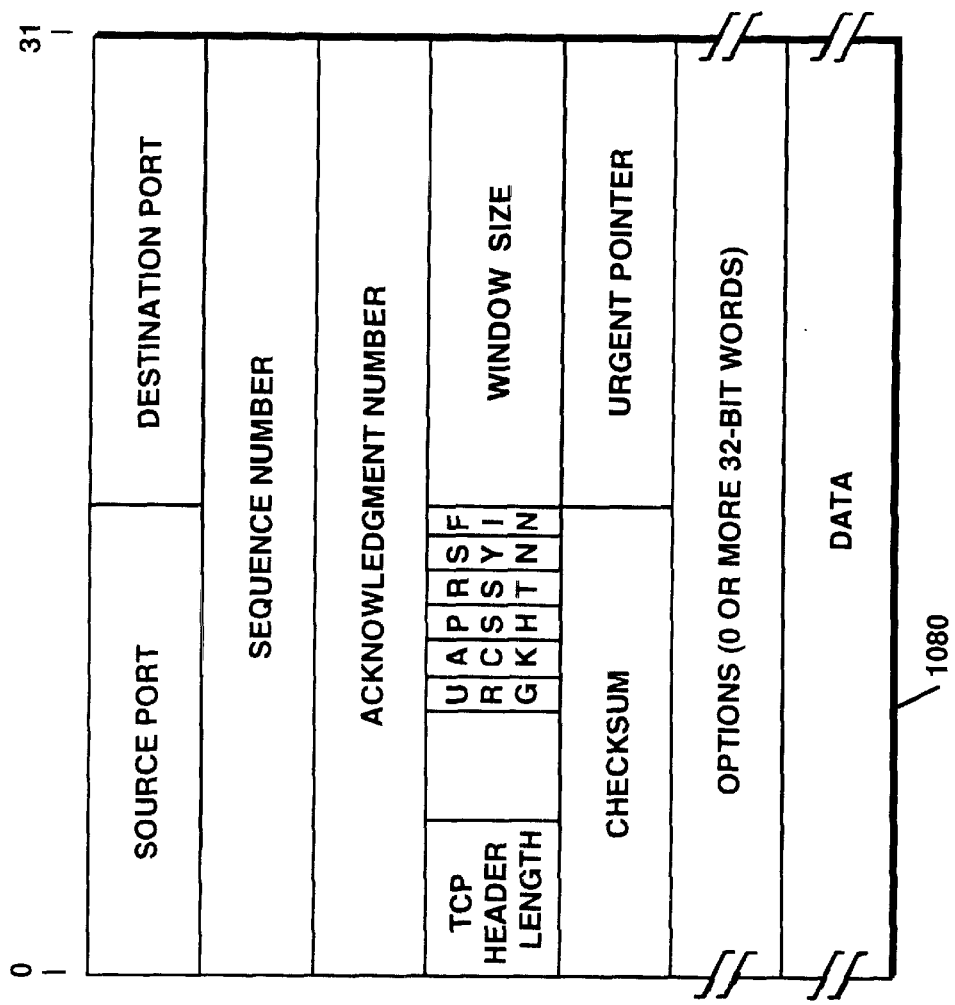
FIG. 42 is a diagram of a flow information data structure and a portion of an application policy record according to principles of the present invention; and, FIG. 43 is a flow chart of the method of graduated quality of service according to principles of the present invention.

FIG. 41 is a diagram of an IP (Internet Protocol) packet 1000 used in the present embodiment of the invention. The IP packet 1000 has a plurality of fields of information. The version number and header length field 1005 holds the version of the IP protocol the packet belongs to and the length of the packet header in 32-bit words. The type of service field 1010 allows a host to tell an internet device (i.e. a switch or a router) what kind of service it wants. The data length field 1015 holds the number of data bytes in the transmission. The data byte count is used in determining whether a flow is a bulk transfer. The identifier field 1020 is needed by the destination host in determining which packet a newly arrived fragment belongs to. All fragments of a data packet have the same identification value. The fragmentation field 1025 gives more fragment information including the offset in a current data packet where the current fragment belongs. The time to live field 1030 is a counter used to limit packet lifetimes. The protocol field 1035 holds transport information. The header checksum field 1040 is useful for header verification only. The source IP address 1045 and destination IP address 1050 supply the source and destination addressing information. The IP Options field 1055 allows users to add more information if the information was not present in initial packet design. The transport header and data field 1060 holds TCP or UDP packets. FIG. 42 is a diagram of a TCP (Transmission Control Protocol) packet 1080 typical of bulk data transactions such as e-mail and file transfers. TCP enables two hosts to establish a connection and exchange streams of data. TCP also guarantees delivery of the data and guarantees that data packets will be delivered in the same order in which they were sent.

Returning to FIG. 4, the block diagram of RE (Relay Engine, also called the Forwarding Engine) 40. A primary function of the RE 40 is to examine canonicalized packet headers received at interface 74 from the QM (Queue Manager) 30 and to determine rapidly whether the packet belongs to a known flow and to provide instructions accordingly on interface 75 for appropriate scheduling (quality of service). A special handler 1085 in the FE code and data DRAM 42 holds a cumulative data byte count of the data bytes as the packets of the flow arrive. That DRAM 42 also holds a threshold value 1087 to which the data byte count is compared in order to determine whether a flow is a bulk data transfer.

The flow determination includes making a determination whether the known flow is a bulk transfer of data. The RE 40 compares an accumulated data byte count (described further below) for each flow to a predetermined threshold value. If the data byte count is above the threshold value, the flow is a bulk transfer and the RE 40 instructs the QM 30 to lower the quality of service to that flow so that more time-sensitive data may continue to receive adequate scheduling services. If the data byte count is below the threshold value, the flow is provided with non-bulk transfer quality of service.

Layer 2/Layer 3 information is used to find the outgoing circuit (link) for a given packet. In the present embodiment of the invention, every circuit in the system is set up with 16 queues. In alternative embodiments of the invention, there may be more or fewer queues. The decision on which of these 16 queues to place the packet is based on higher layer information (layers 4–7). The graduated priority quality of service of the present invention is overlaid onto 8 of the 16 queues, the 8 weighted round robin queues.

Referring now to FIG. 5, data cells in the Receive FIFO 330 are placed in the main system packet memory DRAMs 35 and 3 6 while the canonical headers of the SOPs are forwarded in a FIFO 394 to the relay engine 40 where FastPath™ processes are applied to enable appropriate queuing of packets on per flow, per priority and per port queues 332 (static priority, as discussed below) and 333 (weighted robin priority, as discussed below) to be transmitted to the MOM Transmit Ports 24' (or the DAD 66 to be distributed on circuit queues 350 for further distribution to T1 and POTS Port Transmit Queues 69") for transmission. The data byte counts for each received packet is stored for each identified flow in a data byte count buffer. As packets are identified as being part of a particular flow, the counts in the buffer are incremented.

Figure 43:
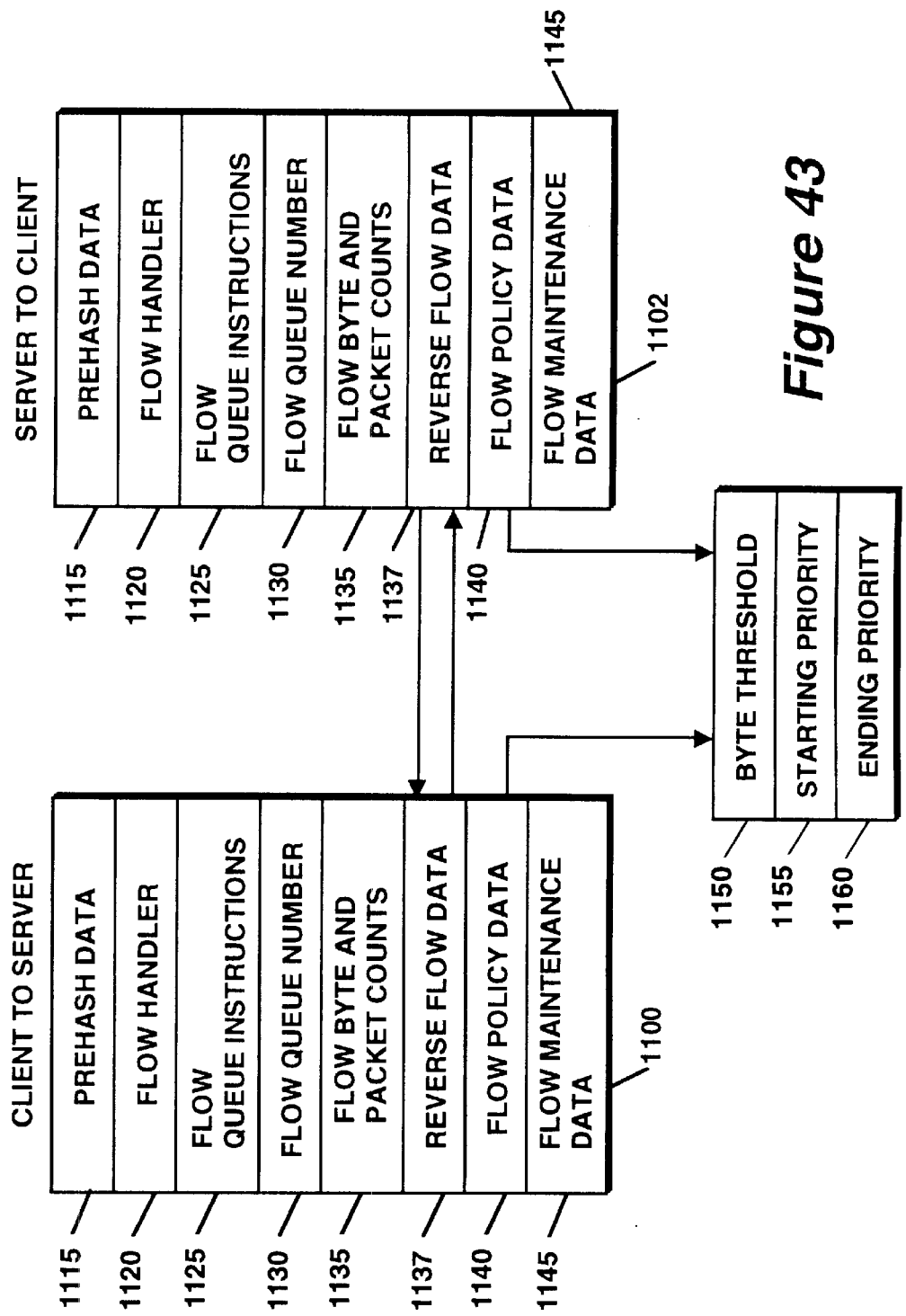

FIG. 43 is a diagram of flow information data structures 1100, 1102 located in the forwarding engine (FE) code and data DRAM 45 (FIG. 1), and a portion of an application policy record 1110, also located in the forwarding engine code and data DRAM 45. Each flow has two flow information data structures 1100, 1102. A first flow information data structure 1100 is for the client to server flow direction. A second flow information data structure 1102 is for the server to client flow direction.

The flow information data structures 1100, 1102 have a plurality of fields. A pre-hash data field 1115 holds information extracted from a data packet before hashing takes place. The data extracted is that which is used in the flow identification process. The flow handler field 1120 is a pointer to a software routine that completes any additional processing required for a flow of a given type. The flow queue instructions field 1125 contains the instruction for placing the flow on a particular queue and the number of the particular queue is stored in the flow queue number field 1130. The flow byte and packet counter field 1135 holds the byte and packets counts for the flow. The reverse flow data field 1137 links the two flow information data structures 1100, 1102 together. The reverse flow data field of the client/server flow information data structure 1100 has a pointer to the server/client flow information data structure 1102 and vice versa. The flow policy data field 1140 holds a pointer that points to the application policy record 1110. In the present embodiment, the flow policy data field 1140 of both the flow information data structures points to the same policy record, however, they may each point to different policy records in alternative embodiments of the invention. The flow maintenance data field 1145 contains software overhead that keeps the data structures consistent within the switch.

The application policy record 1110 holds handling data and parameters for each type of flow that may come through the switch. The portion of the application policy record shown in FIG. 42 has three fields, a threshold value field 1150, a starting priority field 1155, and an ending priority field 1160, which are used to determine bulk flows, and quality of service. If the data byte count goes above the threshold value, then the flow is a bulk data transfer. The starting priority field 1155 stores the priority accorded to a particular flow at the beginning of the flow before a bulk transfer determination is made. The ending priority field 1160 stores the priority accorded to a particular flow after a bulk transfer determination is made. Together, these three fields hold the policy parameters for the quality of service to be received for a particular type of flow.

Figure 44:
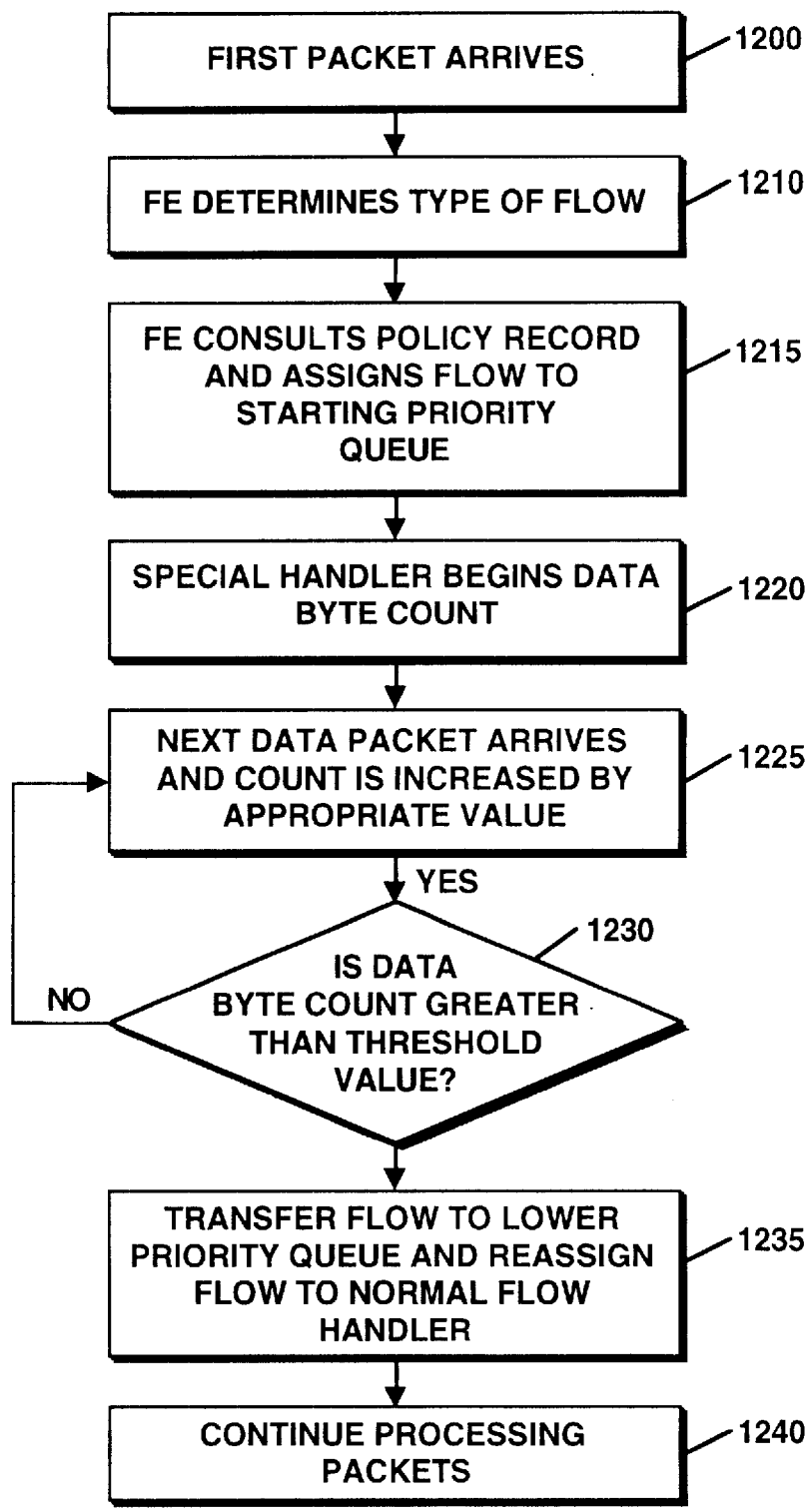
FIG. 44 is a flow diagram of the method of scheduling bulk transfer quality of service.

FIG. 44 is a flow diagram of the method of scheduling bulk transfer quality of service. A first packet arrives at the switch, block 1200. The forwarding engine 40 determines the type of flow that the initial packet belongs to, block 1210. Flows which are to obtain graduated priority service are assigned to one of the 8 graduated priority queues. The forwarding engine consults the policy record for the initial priority level of the particular flow identified, block 1215. The flow is then assigned to the queue specified in the starting priority field 1155 of the policy record 1110. A special handler 1085 in the forwarding engine code and data DRAM 42 begins to count the number of bytes received from that particular flow, block 1220. This count is stored in the flow byte and packet count field 1135 of the flow information data structure 1100. The data byte count value is compared with the threshold value, decision block 1230. If the data byte count is not greater than the threshold value, then the data packets continue to be processed at the same priority set at the start of the flow. If, however, the data byte count is greater than the threshold value, the data flow is reassigned to a lower priority queue and data packets for the rest of the flow are processed by the queue specified in the ending priority field of the policy record, block 1235. The flow is also moved from the special handler to a normal handler. The remaining packets of the bulk data transfer flow are processed at the lower priority queue, block 1240. This action opens up a bandwidth required by other application flows destined to the same circuit as well as other flows of the same application which do not violate the byte threshold.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A process for flexibly connecting between a receive physical path and a transmit physical path the flow of data packets, said process comprising:
    (a) receiving a data packet on said receive physical path;
    (b) determining whether said data packet is part of a flow initiated in a previously received data packet;
        (i) if not, then adding the number of data bytes of said currently received data packet to a count of the total number of data bytes received as part of a new flow;
        (ii) if so, then adding the number of data bytes of said currently received data packet to a count of the total number of data bytes counted as part of said previously initiated flow;
    (c) determining whether the total counts of the number of data bytes received resulting from said adding steps exceeds a given threshold;
        (i) if not, then applying a first quality of service sequence for transmission;
        (ii) if so, then applying a second quality of service sequence for transmission; and
    (d) transmitting data packets that are part of said flow according to said applied quality of service sequence.

2. The process of claim 1 wherein said step (c) of determining whether the count of data bytes received exceeds said given threshold is a constant affirmative for a particular flow after said threshold is first exceeded for said flow.

3. The process of claim 1 wherein step (b) of determining whether said data packet is part of a flow initiated by a previously received packet further comprises the step (b1) of comparing the contents of a field of said data packet containing information identifying said flow with the contents of a corresponding field in said previously received data packet.

4. The process of claim 3 wherein step (b1) of comparing the contents of said fields is performed by comparing the results of hashing said fields.

5. The process of claim 3 wherein the fields compared in said step (b1) are corresponding portions of Layer 2 or higher layer headers of said data packets.

6. The process of claim 1 further comprising the step of dividing said received data packet into canonical cells upon receipt of said data packet.

7. The process of claim 6 wherein step (d) of transmitting data packets is performed by transmitting sequentially the data in said respective canonical cells extracted from received data packets.

8. The process of claim 7 wherein each sequential one of said cells of said received data packet is stored in a memory location, logically linked and queued for transmission.

9. The process of claim 8 wherein said logical linking and queuing are performed by linking pointers to the respective memory locations where said cells are stored.

10. The process of claim 9 wherein said quality of service sequences are determined by respective sequences of entries in respective tables of pointers to said pointers.

11. The process of claim 10 wherein said given threshold of data bytes counted indicates a bulk document being transferred and said second quality of service sequence includes a smaller proportion of pointers to data packets associated with said flow in proportion to pointers to data packets associated with all active flows.

12. The process of claim 2 wherein said given threshold of data bytes counted indicates a bulk document being transferred and said second quality of service sequence results in fewer transmissions of data packets associated with said flow in a given period of time than does said first quality of service sequence.

13. A process for flexibly connecting between a receive physical path and a transmit physical path the flow of data packets with a downward adjustment in quality of service for flows determined to be associated with bulk data transfers, said process comprising;
    (a) receiving a data packet on said receive physical path;
    (b) dividing said received data packet into canonical cells;
    (c) for each sequential one of said cells,
        (i) storing said cell and logically linking it to a prior cell divided from the same data packet, if any;
        (ii) determining whether said sequence of cells in part of a data packet is part of a flow initiated in a previously received data packet by comparing respective information derived from respective data fields of said data packets identifying said flow;
            (A) if not, then adding the number of data bytes of said received packet to a count of the total number of data bytes received as part of a new flow;
            (B) if so, then adding the number of data bytes of said received packet to a count of the number of data bytes counted as part of said previously initiated flow;
        (iii) determining whether the total counts of the number of data bytes received resulting from said adding exceeds a given threshold associated with bulk data transfer for a particular application;
            (A) if not, then applying a first quality of service sequence for transmission of data packets of said flow;
            (B) if so, then applying a second quality of service queue that provides for less frequent transmission; and
    (d) transmitting data packets that are part of said flow according to said linking of cells and said applied quality of service queue.

14. An apparatus for flexibly connecting between a receive physical path and a transmit physical path the flow of data packets, comprising:
- (a) a receiving means for receiving a data packet on said receive physical path;
- (b) flow determining means for determining whether said data packet is part of a flow initiated in a previously received data packet, said flow determining means having data byte count means for producing a data byte count further comprising,
  - adding means to add the number of data bytes of said received packet to a count of the total number of new flow data bytes received if said data packet is not part of said previously initiated flow, and to add the number of data bytes of said received packet to a count of the total number of previous flow data bytes if said data packet is part of said previously initiated flow;
- (c) threshold means for determining whether the total counts of the number of data bytes exceeds a given threshold,
  - (i) means for applying a first quality of service sequence for transmission if said data byte count does not exceed said given threshold, and
  - (ii) means for applying a second quality of service sequence for transmission if said data byte count does exceed said given threshold; and
- (d) transmitting means for transmitting data packets that are part of said flow according to said applied quality of service sequence.

15. The apparatus of claim 14 wherein said threshold means is a constant affirmative for a particular flow after said given threshold is first exceeded for said particular flow.

16. The apparatus of claim 14 wherein said flow determining means further comprises comparing means for comparing the contents of a field of said data packet with the contents of a corresponding field in said previously received data packet.

17. The apparatus of claim 16 wherein said comparing means further comprises a means for hashing the contents of each said fields, the hashed fields to be compared by said comparing means.

18. The apparatus of claim 16 wherein the fields compared by said comparing means are corresponding portions of Layer 2 or higher layer headers of said data packets.

19. The apparatus of claim 14 further comprising:
- means for dividing said received packet into canonical cells upon receiving said data packet.

20. The apparatus of claim 19 wherein said means for transmitting data packets further comprises means for transmitting sequentially the data in said respective canonical cells extracted from received data packets.

21. The apparatus of claim 20 further comprising storing means for storing each sequential one of said cells of said received data packet in a memory location, logically linked and queued for transmission.

22. The apparatus of claim 21 said storing means has queue pointers for logically linking and queueing the respective memory locations wherein said cells are stored.

23. The apparatus of claim 22 wherein said quality of service sequences are determined by respective sequences of entries in respective tables of pointers to said queue pointers.

24. The apparatus of claim 23 wherein said given threshold indicates a bulk document being transferred, and said second quality of service sequence includes a smaller proportion than said first quality of service sequence of pointers to data packets associated with said flow in proportion to pointers to data packets associated with all active flows.

25. The apparatus of claim 15 wherein said given threshold number indicates a bulk document being transferred and said second quality of service sequence results in fewer transmissions of data packets associated with said flow in a given period of time than does said first quality of service sequence.

26. An apparatus for flexibly connecting between a receive physical path and a transmit physical path the flow of data packets with a downward adjustment in quality of service for flows determined to be associated with bulk data transfers, comprising:
- (a) receive means for receiving a data packet on said receive physical path;
- (b) canonicalization means for dividing said received data packet into canonical cells;
- (c) storage means for storing each sequential one of said cells and logically linking each said cell to a prior cell divided from a same data packet, if such a prior cell exists;
- (d) means for determining for each sequential one of said cells whether said cell is part of a data packet in a flow initiated by a previously received data packet by comparing respective information derived from respective data fields of said data packets identifying said flow;
- (e) first data byte count means for determining a data byte count by adding the number of data bytes of said received data packet to a count of the total number of data bytes received as part of a new flow;
- (f) second data byte count means for determining a total data byte count by adding the number of data bytes of said received packet to a count of the total number of data bytes previously counted as part of said previously initiated flow;
- (g) threshold means for determining whether the counts of the total number of received data bytes exceeds a given threshold associated with bulk data transfer for the application;
- (h) first adding means for adding the number of data bytes presented to a count of the number of data bytes received as part of a new flow if said data packet is not part of said previously initiated flow, and
- (i) second adding means for adding the number of data bytes presented to a count of the number of data bytes previously counted as part of said previously initiated flow if said data packet is part of said previously initiated flow; and,
- (j) transmitting means for transmitting data packets that are part of said flow according to said linking of cells and said applied quality of service sequence.

27. A network switch for flexibly connecting between a receive physical path and a transmit physical path a flow of data packets, comprising:
- a network interface connected to the receive physical path and the transmit physical path, said network interface for receiving a data packet on said receive physical path, said network interface for counting the data bytes presented in said data packet;
- a forwarding engine connected to said network interface for determining whether said data packet is part of a new flow or a previously initiated flow;
- a data byte count buffer connected to said forwarding engine for storing a data byte count for each identified flow, responsive to said network interface and said forwarding engine, said forwarding engine for comparing the data byte count of each flow stored in said data byte count buffer to a predetermined threshold value in order to determine whether a particular flow is a bulk transfer, said forwarding engine for determining a quality of service for a particular flow in response to the data count byte comparison; and, a queue manager connected to said forwarding engine for scheduling transmission of said data packet responsive to said determinations of said forwarding engine.

28. An apparatus for flexibly connecting a receive physical path and a transmit physical path a flow of data packets, comprising:

an interface to receive a data packet;

a memory to store said data packet, said memory also to store a threshold value;

a counter to keep a data byte count for the flow received at said interface, said counter incrementing said data byte count each time a packet is received at said interface; and a microprocessor interacting with said memory and said counter, said microprocessor determining whether said data packet is part of a particular flow, said microprocessor determining whether said data byte count exceeds said threshold value indicating that said flow is a bulk flow, said microprocessor specifying a quality of service for transmitting said data packet in response to said flow determinations, said interface transmitting said data packet according to said quality of service.

29. An information packet switch comprising:

A) at least one packet receiver;

B) a parser connected to said receiver, said parser dividing information packets received by said receiver into uniform cells large enough to contain header information identifying the application stream of said packet;

C) fast memory connected to said parser organized into locations to accomodate said cells, said parser setting pointers to maintain the association and order of said cells relative to said received information packets;

D) a comparator connected to said parser, said comparator connected to a dedicated memory containing information identifying the application stream of information packets obtained from packets received during a prior window of time, said comparator comparing prior information and information from a newly received packet and adding to said dedicated memory identifying information of said newly received packet if it does not match prior information or identifying the pointers to the cells of said newly received packet with one of said prior received packets;

E) at least one transmitter connected to said fast memory;

F) a logic processor programmed to cause said transmitter to transmit information from said fast memory according to quality of service policies associated with a particular type of application stream and in the order maintained by said pointers within s packet; and G) said logic processor further responsive to an information quantity counter to count received data bytes to determine whether said application stream is a bulk transfer type of application stream.

* * * * *